United States Patent
Park et al.

(10) Patent No.: US 11,977,703 B2
(45) Date of Patent: May 7, 2024

(54) TOUCH DETECTION MODULE AND DISPLAY DEVICE INCLUDING THE SAME

(71) Applicant: Samsung Display Co., LTD., Yongin-si (KR)

(72) Inventors: Jin Woo Park, Yongin-si (KR); Min Hong Kim, Yongin-si (KR); Tae Joon Kim, Yongin-si (KR); Il Ho Lee, Yongin-si (KR); Wan Kee Jun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/174,523

(22) Filed: Feb. 24, 2023

(65) Prior Publication Data

US 2023/0359303 A1 Nov. 9, 2023

(30) Foreign Application Priority Data

May 4, 2022 (KR) .......................... 10-2022-0055256

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0446* (2019.05)

(58) Field of Classification Search
CPC ... G06F 3/04166; G06F 3/0412; G06F 3/0446
See application file for complete search history.

(56) References Cited

U.S. PATENT DOCUMENTS

| | | | | |
|---|---|---|---|---|
| 7,907,020 | B2* | 3/2011 | Wilson | H03L 7/085 331/16 |
| 8,085,247 | B2* | 12/2011 | Wilson | G06F 3/0446 324/519 |
| 8,614,587 | B1* | 12/2013 | Ogirko | G01R 27/2605 324/686 |
| 9,329,735 | B2* | 5/2016 | Tun | G06F 3/0446 |
| 10,599,264 | B2* | 3/2020 | Park | G06F 3/044 |
| 10,892,766 | B2* | 1/2021 | Lee | H03M 1/60 |
| 11,221,708 | B2* | 1/2022 | Jonsson | H03M 1/0827 |

(Continued)

FOREIGN PATENT DOCUMENTS

KR 10-2008-0043170 A 5/2008
KR 10-2010-0120456 A 11/2010

(Continued)

*Primary Examiner* — Vinh T Lam
(74) *Attorney, Agent, or Firm* — Lewis Roca Rothgerber Christie LLP

(57) ABSTRACT

A touch detection module, includes: a plurality of driving electrodes arranged side by side; a plurality of sensing electrodes staggered with respect to the driving electrodes; and a touch driving circuit configured to supply touch driving signals to the plurality of driving electrodes and to detect touch detection signals through the plurality of sensing electrodes to identify touch position coordinates, wherein the touch driving circuit is configured: to vary frequency modulation parameter set values in response to a change in a frequency of reference clocks, and to generate and supply a frequency of the touch driving signals by using the reference clocks and a varied frequency modulation parameter set value.

20 Claims, 15 Drawing Sheets

(56) References Cited

U.S. PATENT DOCUMENTS

| | | | |
|---|---|---|---|
| 11,221,709 B2* | 1/2022 | Van Ostrand | G06F 3/0441 |
| 11,269,458 B2* | 3/2022 | Van Ostrand | G09G 3/3225 |
| 11,307,709 B2* | 4/2022 | Jeong | H10K 50/84 |
| 11,429,226 B2* | 8/2022 | Gray | G06F 3/04166 |
| 11,550,426 B2* | 1/2023 | Gray | G06F 3/04166 |
| 2019/0129571 A1* | 5/2019 | Choi | G06F 3/044 |
| 2022/0018682 A1* | 1/2022 | Gray | G06F 3/04166 |
| 2022/0057898 A1* | 2/2022 | Lee | H10K 59/40 |
| 2022/0100309 A1* | 3/2022 | Jonsson | H03M 1/0827 |
| 2022/0147185 A1* | 5/2022 | Kim | G06F 3/046 |
| 2023/0022093 A1* | 1/2023 | Park | H10K 59/40 |
| 2023/0297191 A1* | 9/2023 | Lee | G06F 3/04166 |
| | | | 345/174 |

FOREIGN PATENT DOCUMENTS

| | | | |
|---|---|---|---|
| KR | 10-2012-0065549 A | 6/2012 | |
| KR | 10-2019-0048151 A | 5/2019 | |

* cited by examiner

| Touch Driving Signal Generation | | |
|---|---|---|
| Reference Clock Frequency | Frequency Modulation Parameter Set Value | Touch Driving Signal Frequency |
| 50MHz | A value (ex. 251) | 208KHz |
| 49MHz | B value (ex. 252) | 208KHz |
| 51MHz | C value (ex. 249) | 208KHz |

FIG. 12
| Touch Driving Signal Generation | | |
|---|---|---|
| Reference Clock Voltage | Voltage Modulation Parameter Set Value | Touch Driving Signal Voltage |
| 1V | A value (ex. 2.0) | 2.0V |
| 1.1V | B value (ex. 1.9) | 2.0V |
| 0.9V | C value (ex. 2.1) | 2.0V |
FIG. 13
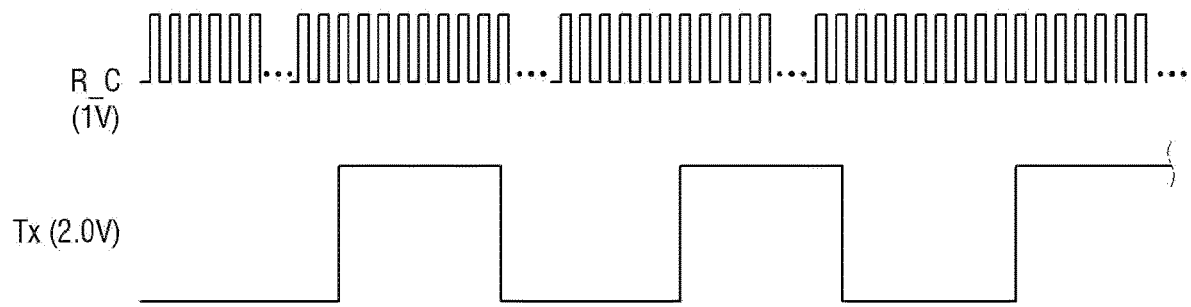
FIG. 14
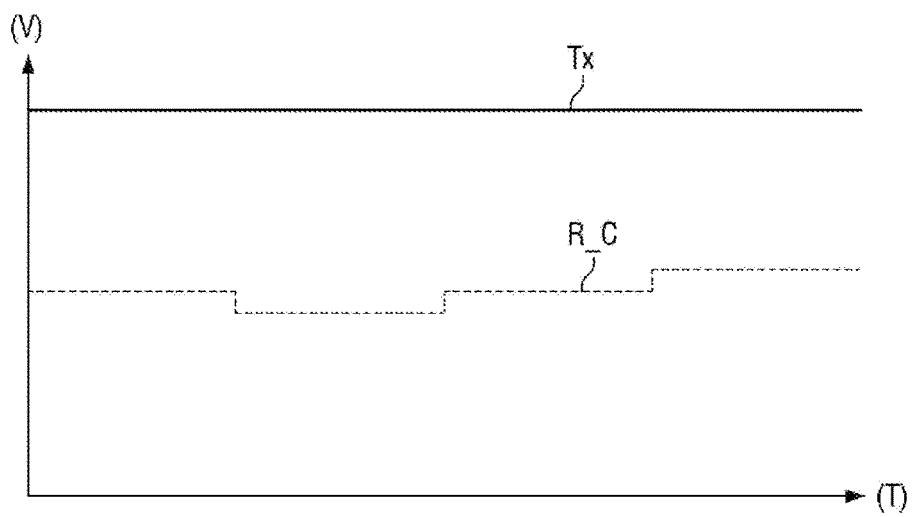

TOUCH DETECTION MODULE AND DISPLAY DEVICE INCLUDING THE SAME

CROSS-REFERENCE TO RELATED APPLICATION

The present application claims priority to and the benefit of Korean Patent Application No. 10-2022-0055256 filed on May 4, 2022, in the Korean Intellectual Property Office, the entire content of which is incorporated herein by reference.

BACKGROUND

1. Field

Aspects of some embodiments of the present disclosure relate to a touch detection module and a display device including the same.

2. Description of the Related Art

The information society in its progression sees the increasing demand for various forms of image display devices. For example, display devices may be utilized with or incorporated into various electronic devices such as smartphones, digital cameras, notebook computers, navigation systems, and smart televisions.

A display device may be a flat panel display device such as a liquid crystal display device, a field emission display device, or an organic light emitting display device. Among flat panel display devices, light emitting display device generally includes a light emitting device provided with a display panel in which each pixel can emit light autonomously, thereby displaying images without the use of a backlight unit in order to provide light to the display panel.

In recent times, display devices include a touch detection module for detecting a user's touch as one of the input interfaces. The touch detection module includes a touch sensing unit with an arrangement of touch electrodes, and a touch driving circuit for detecting an amount of charge established in the capacitance between the touch electrodes. The touch detection module may be mass-produced integrally formed on an image display unit of the display device or while being mounted on the front surface of the image display unit.

The above information disclosed in this Background section is only for enhancement of understanding of the background and therefore the information discussed in this Background section does not necessarily constitute prior art.

SUMMARY

Aspects of some embodiments of the present disclosure include a touch detection module (or touch detector, or touch detection component, or touch detection circuit) capable of generating a constant frequency of touch driving signals by varying and applying frequency modulation parameters in response to a change in the frequency of reference clocks, and a display device including the touch detection module.

However, the characteristics of embodiments according to the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, a touch detection module, includes: a plurality of driving electrodes arranged side by side; a plurality of sensing electrodes arranged to be staggered with respect to the driving electrodes; and a touch driving circuit configured to supply touch driving signals to the plurality of driving electrodes and detect touch detection signals through the plurality of sensing electrodes to detect touch position coordinates, wherein the touch driving circuit is configured to vary frequency modulation parameter set values in response to a change in a frequency of reference clocks, and to constantly (or regularly, or repeatedly) generate and supply a frequency of the touch driving signals by using the reference clocks and a varied frequency modulation parameter set value.

According to some embodiments, the touch driving circuit includes: a reference clock generation unit configured to generate the reference clocks based on a preset reference frequency; a reference clock detection unit configured to generate frequency information items of the reference clocks in real-time; a data storage unit configured to store and share frequency modulation parameter set values respectively corresponding to the frequency information items of the reference clocks; a touch driving control unit configured to read in real-time, from the data storage unit, the frequency modulation parameter set values corresponding to the frequency information items of the reference clocks, and to generate a touch driving period signal according to the reference clocks and the frequency modulation parameter set values; and a driving signal output unit configured to generate the touch driving signals in response to information on a generation period of the touch driving period signal, and to supply the touch driving signals to the plurality of driving electrodes.

According to some embodiments, the touch driving circuit further includes a sensing circuit unit configured to detect the touch detection signals through the plurality of sensing electrodes; an analog-to-digital conversion unit configured to sequentially convert the touch detection signals into touch data items; a touch data generation unit configured to calculate differential data values of the touch data items by comparing the touch data items with preset detection reference data; and a touch coordinate output unit configured to calculate the touch position coordinates for the touch data items having large differential data values among the touch data items sequentially detected through the touch data generation unit.

According to some embodiments, the frequency modulation parameter set values include period values of the reference clocks, the period values being obtained by setting rising or falling periods of the reference clocks, and wherein the touch driving control unit is configured to generate the touch driving period signal for each generation period of the reference clocks according to the frequency modulation parameter set values to maintain frequencies of the touch driving period signal and the touch driving signals.

According to some embodiments, the touch driving control unit is configured to count the reference clocks that are inputted sequentially, in correspondence with the frequency modulation parameter set values, for generating the touch driving period signal for each of period counts of the reference clocks and maintaining the frequency of the touch driving signals.

According to some embodiments, the touch driving control unit is configured to compare frequency information of the reference clocks inputted from the reference clock detection unit with pre-stored frequency information or reference frequency information to determine whether the reference clocks have a frequency error subjected to a variation, and to be responsive to variations of the frequency information items of the reference clocks for reading, from the data storage unit, frequency modulation parameter set values corresponding to varied frequency information items of the reference clocks.

According to some embodiments, the frequency modulation parameter set values include period values of the reference clocks, the period values being obtained by setting rising or falling periods of the reference clocks, and wherein the touch driving control unit is configured to count the reference clocks that are inputted sequentially, in correspondence with the frequency modulation parameter set values, to generate the touch driving period signal for each of counted periods of the reference clocks, and to generate the touch driving signals based on the touch driving period signal.

According to some embodiments, the touch driving circuit is configured to vary a voltage modulation parameter set value in response to a change in a voltage level of the reference clocks, and to constantly (or regularly or repeatedly) generate and supply a voltage level of the touch driving signals by using the reference clocks and a varied voltage modulation parameter set value.

According to some embodiments, the touch driving circuit includes a reference clock generation unit configured to generate the reference clocks based on a preset reference voltage; a reference clock detection unit configured to generate voltage level information items of the reference clocks in real-time; a data storage unit configured to store and share voltage modulation parameter set values respectively corresponding to the voltage level information items of the reference clocks; a touch driving control unit configured to read in real-time, from the data storage unit, the voltage modulation parameter set values corresponding to the voltage level information items of the reference clocks, and to generate a touch driving period signal according to the reference clocks and the voltage modulation parameter set values; and a driving signal output unit configured to generate the touch driving signals in response to a voltage level of the touch driving period signal, and to supply the touch driving signals to the plurality of driving electrodes.

According to some embodiments, the voltage modulation parameter set values include additional compensatory voltage values for voltages of the reference clocks, and wherein the touch driving control unit is configured to further compensate the voltages of the reference clocks with voltages according to the voltage modulation parameter set values to maintain the voltage level of the touch driving signals.

According to some embodiments, the touch driving control unit is configured to further compensate voltages of the reference clocks that are inputted sequentially with voltages according to the voltage modulation parameter set values to generate a touch driving period signal and maintain the voltage level of the touch driving signals.

According to some embodiments, the touch driving control unit is configured to compare voltage level information of the reference clocks inputted from the reference clock detection unit with pre-stored voltage level information or reference voltage information to determine whether the reference clocks have a voltage error subjected to a variation, and to be responsive to variations of the voltage level information items of the reference clocks for reading, from the data storage unit, voltage modulation parameter set values corresponding to additionally inputted voltage level information items of the reference clocks.

According to some embodiments, the voltage modulation parameter set values include additional compensatory voltage values for voltages of the reference clocks, and wherein the touch driving control unit is configured to further compensate voltages of the reference clocks that are inputted sequentially with voltages according to the voltage modulation parameter set values to generate a touch driving period signal and maintain the voltage level of the touch driving signals.

According to some embodiments of the present disclosure, a display device includes: a display panel including a display area in which a plurality of pixels are arranged; and a touch detection module on a front surface of the display panel and configured to detect a user's touch, wherein the touch detection module includes a plurality of driving electrodes arranged side by side, a plurality of sensing electrodes arranged to be staggered with respect to the driving electrodes, and a touch driving circuit configured to supply touch driving signals to the plurality of driving electrodes and detect touch detection signals through the plurality of sensing electrodes to detect touch position coordinates, and wherein the touch driving circuit is configured to vary frequency modulation parameter set values in response to a change in a frequency of reference clocks, and to constantly (or regularly or repeatedly) generate and supply a frequency of the touch driving signals by using the reference clocks and a varied frequency modulation parameter set value.

According to some embodiments, the touch driving circuit includes a reference clock generation unit configured to generate the reference clocks based on a preset reference frequency; a reference clock detection unit configured to generate frequency information items of the reference clocks in real-time; a data storage unit configured to store and share frequency modulation parameter set values respectively corresponding to the frequency information items of the reference clocks; a touch driving control unit configured to read in real-time, from the data storage unit, the frequency modulation parameter set values corresponding to the frequency information items of the reference clocks, and to generate a touch driving period signal according to the reference clocks and the frequency modulation parameter set values; and a driving signal output unit configured to generate the touch driving signals in response to information on a generation period of the touch driving period signal, and to supply the touch driving signals to the plurality of driving electrodes.

According to some embodiments, the touch driving circuit includes a sensing circuit unit configured to detect the touch detection signals through the plurality of sensing electrodes; an analog-to-digital conversion unit configured to sequentially convert the touch detection signals into touch data items, a touch data generation unit configured to calculate differential data values of the touch data items by comparing the touch data items with preset detection reference data; and a touch coordinate output unit configured to calculate the touch position coordinates for the touch data items having large differential data values among the touch data items sequentially detected through the touch data generation unit.

According to some embodiments, the frequency modulation parameter set values include period values of the reference clocks, the period values being obtained by setting rising or falling periods of the reference clocks, and wherein the touch driving control unit is configured to generate the touch driving period signal for each generation period of the reference clocks according to the frequency modulation parameter set values to maintain the touch driving period signal and the frequency of the touch driving signals.

According to some embodiments, the touch driving control unit is configured to count the reference clocks that are inputted sequentially, in correspondence with the frequency modulation parameter set values, for generating the touch driving period signal for each of period counts of the reference clocks and maintaining the frequency of the touch driving signals.

According to some embodiments, the touch driving control unit is configured to compare frequency information of the reference clocks inputted from the reference clock detection unit with pre-stored frequency information or reference frequency information to determine whether the reference clocks have a frequency error subjected to a variation, and to be responsive to variations of the frequency information items of the reference clocks for reading, from the data storage unit, frequency modulation parameter set values corresponding to varied frequency information items of the reference clocks.

According to some embodiments, the frequency modulation parameter set values include period values of the reference clocks, the period values being obtained by setting rising or falling periods of the reference clocks, and wherein the touch driving control unit is configured to count the reference clocks that are inputted sequentially, in correspondence with the frequency modulation parameter set values, to generate the touch driving period signal for each of period counts of the reference clocks, and to generate the touch driving signals based on the touch driving period signal.

BRIEF DESCRIPTION OF THE DRAWINGS

The above and other aspects and characteristics of embodiments according to the present disclosure will become more apparent by describing in more detail aspects of some embodiments thereof with reference to the attached drawings, in which:

FIG. 12 is a diagram illustrating voltage modulation parameter set values and voltage modulation characteristics of touch driving signals according to some embodiments.

FIG. 13 is a waveform diagram illustrating generation periods and voltage levels of the reference clocks and the touch driving signals in a touch driving circuit according to some embodiments.

FIG. 14 is a graph illustrating voltage changes of reference clocks and touch driving signals in a touch driving circuit according to some embodiments.

DETAILED DESCRIPTION

Aspects of some embodiments of the present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, aspects of some embodiments of the present disclosure will be described in more detail with reference to the attached drawings.

Figure 1:
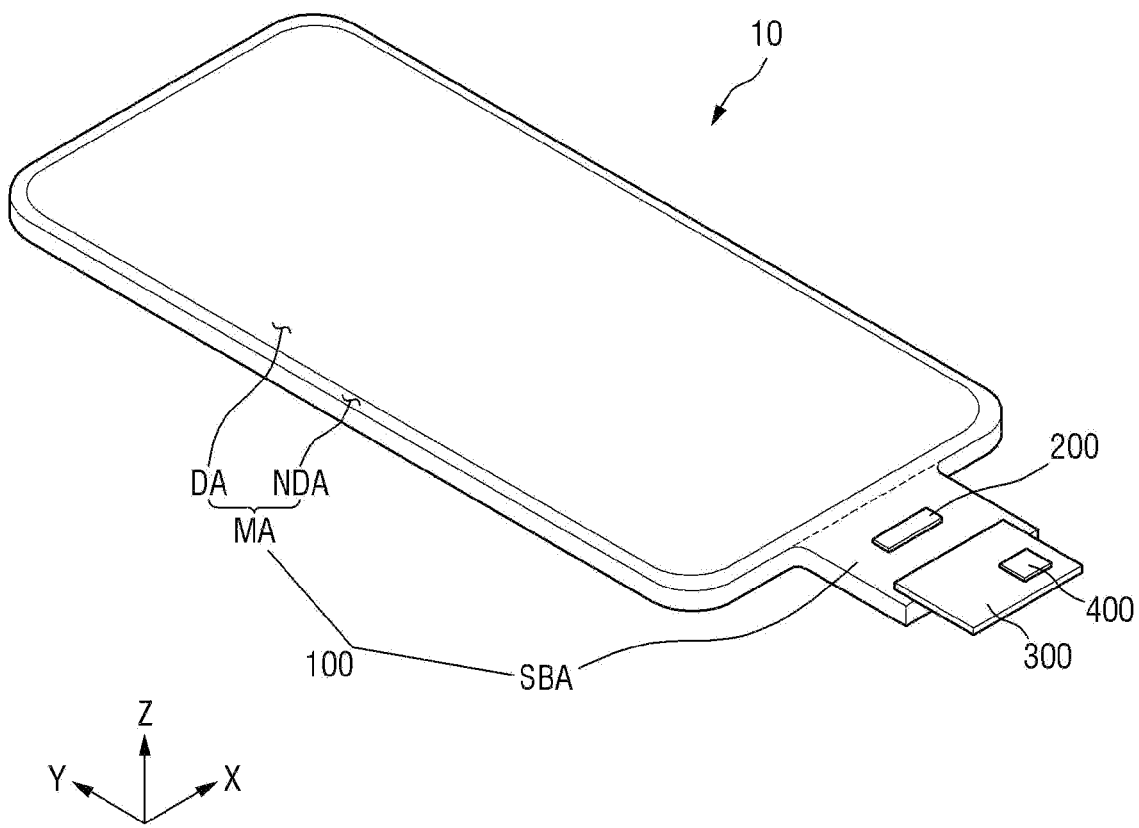
FIG. 1 is a perspective view of a display device according to some embodiments.
Figure 2:
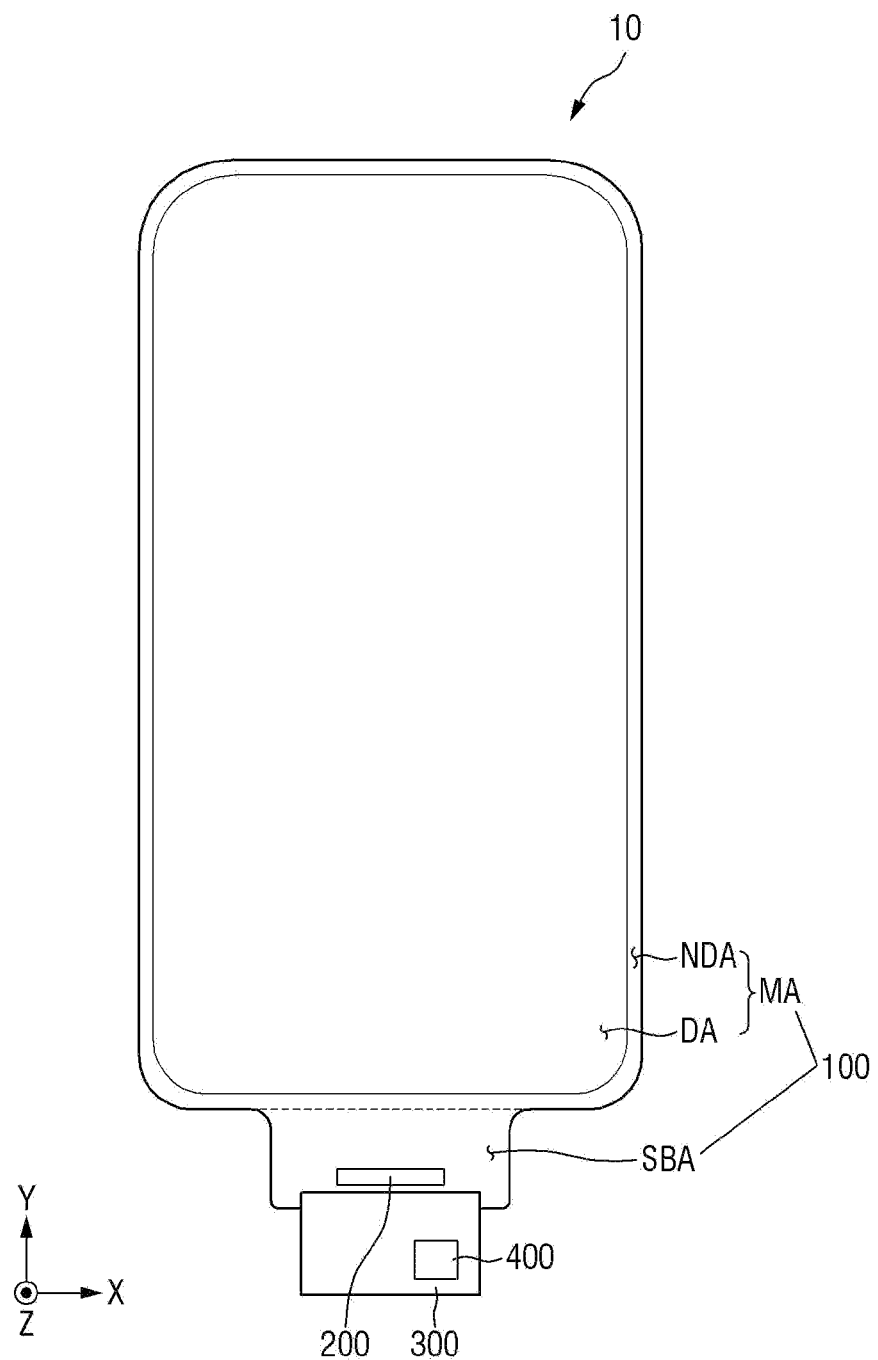
FIG. 2 is a plan view of the display device according to some embodiments.

FIG. 1 is a perspective view of a display device according to some embodiments. FIG. 2 is a plan view of the display device according to some embodiments, and FIG. 3 is a side view of the display device according to some embodiments.

Figure 3:
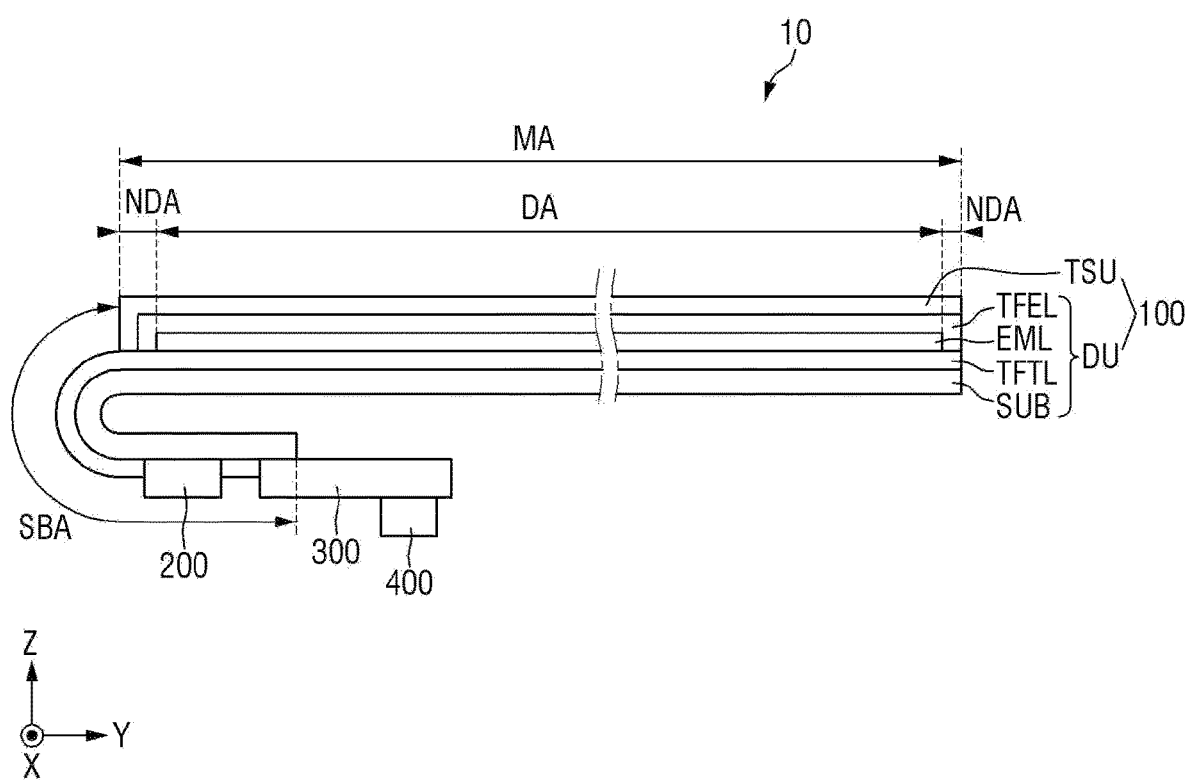
FIG. 3 is a side view of the display device according to some embodiments.

Referring to FIGS. 1 to 3, a display device 10 according to some embodiments may be applied to a portable electronic device such as a mobile phone, a smartphone, a tablet personal computer (PC), a mobile communication terminal, an electronic notebook, an electronic book, a portable multimedia player (PMP), a navigation system, and an ultra-mobile PC (UMPC). Alternatively, the display device 10 according to some embodiments may be applied as a display unit of a television, a laptop computer, a monitor, a billboard, or the Internet of Things (IoT). Yet alternatively, the display device 10 according to some embodiments may be applied to a wearable device such as a smartwatch, a watch phone, a glasses-type display, and a head-mounted display (HMD). Yet alternatively, the display device 10 according to some embodiments may be applied to a dashboard of a vehicle, a center fascia of the vehicle, a center information display (CID) located on a dashboard of the vehicle, and a room mirror display that replaces the vehicle side mirrors, or a display located on the back of the front seat as entertainment means for the rear seat of the vehicle.

The display device 10 according to some embodiments may be a light emitting display device such as an organic light emitting display device using an organic light emitting diode, a quantum dot light emitting display device including a quantum dot light emitting layer, an inorganic light emitting display device including an inorganic semiconductor, and a micro or nano light emitting display device using a micro or nano light emitting diode (micro LED or nano LED). The following mainly describes the display device 10 according to some embodiments as an organic light emitting display device, but the present disclosure is not limited thereto.

The display device 10 according to some embodiments includes a display panel 100, a display driving circuit 200, a display circuit board 300, and a touch driving circuit 400.

The display panel 100 may be formed as a rectangular plane having a short side in the first (X-axis) direction and a long side in the second (Y-axis) direction intersecting the first (X-axis) direction. A corner where the short side in the first (X-axis) direction meets the long side in the second (Y-axis) direction may be rounded to have a curvature (e.g., a set or predetermined curvature) or may be formed at a right angle. The plane shape of the display panel 100 is not limited to a quadrangle and may be formed in other shapes like polygons, circles, or ovals. The display panel 100 may be formed to be flat or planar, but embodiments according to the present disclosure are not limited thereto. For example, the display panel 100 includes curved portions formed at the left and right ends and having a set or predetermined curvature or a varying curvature. Additionally, the display panel 100 may be flexibly formed to be bent, flexing, bending, folded, or rolled.

The display panel 100 includes a main area MA and a sub-area SBA.

The main area MA includes a display area DA for displaying an image and a non-display area NDA which is a peripheral area of the display area DA. The display area DA includes pixels for displaying an image. The sub-area SBA may protrude from one side of the main area MA in the second (Y-axis) direction.

FIGS. 1 and 2 illustrate that the sub-area SBA is unfolded, although the sub-area SBA may be bent as shown in FIG. 3, wherein it may be located on the lower surface of the display panel 100. When the sub-area SBA is bent, it may overlap the main area MA in the third (Z-axis) direction (e.g., in a plan view of the display panel 100) which is the thickness direction of a substrate SUB. The display driving circuit 200 may be located in the sub-area SBA.

Additionally, as shown in FIG. 3, the display panel 100 includes a display module DU and a touch sensing unit TSU formed on the front surface of the display module DU, wherein the display module DU includes the substrate SUB, a thin film transistor layer TFTL, a light emitting device layer EML, and an encapsulation layer TFEL.

The thin-film transistor layer TFTL may be located on the substrate SUB. The thin-film transistor layer TFTL may be located in both the main area MA and the sub-area SBA. The thin-film transistor layer TFTL includes thin-film transistors.

The light emitting device layer EML may be located on the thin film transistor layer TFTL. The light emitting device layer EML may be located in the display area DA of the main area MA. The light emitting device layer EML includes light emitting devices arranged in light emitting units.

The encapsulation layer TFEL may be located on the light emitting device layer EML. The encapsulation layer TFEL may be located in both the display area DA and the non-display area NDA of the main area MA. The encapsulation layer TFEL includes at least one inorganic layer and at least one organic layer for encapsulating the light emitting device layer EML.

The touch sensing unit TSU may be formed on the encapsulation layer TFEL or mounted on the encapsulation layer TFEL. The touch sensing unit TSU may be located in the display area DA of the main area MA. The touch sensing unit TSU may detect a touch of a person or an object by using touch electrodes.

On the touch sensing unit TSU, a cover window may be utilized for protecting the top of the display panel 100. The cover window may be attached to the touch sensing unit TSU by a transparent adhesive member such as an optically clear adhesive (OCA) film or an optically clear resin (OCR). The cover window may be an inorganic material such as glass, or an organic material such as plastic or polymer material. To prevent deterioration of image visibility due to the reflection of external light, a polarizing film may be further located between the touch sensing unit TSU and the cover window.

The display driving circuit 200 may generate signals and voltages for driving the display panel 100. The display driving circuit 200 may be formed of an integrated circuit (IC) and attached to the display panel 100 by a chip on glass (COG) method, a chip on plastic (COP) method, or an ultrasonic bonding method, but embodiments according to the present disclosure are not limited thereto. For example, the display driving circuit 200 may be attached to the display circuit board 300 in a chip on film (COF) method.

The display circuit board 300 may be attached to one end of the sub-area SBA of the display panel 100. This may allow the display circuit board 300 to be electrically connected to the display panel 100 and the display driving circuit 200. The display panel 100 and the display driving circuit 200 may receive digital video data, timing signals, and driving voltages through the display circuit board 300. The display circuit board 300 may be a flexible printed circuit board, a printed circuit board, or a flexible film such as a chip on film.

The touch driving circuit 400 may be located on the display circuit board 300. The touch driving circuit 400 may be formed of an integrated circuit (IC) and attached to the display circuit board 300.

The touch driving circuit 400 may be electrically connected to the touch electrodes of the touch sensing unit TSU. The touch driving circuit 400 applies touch driving signals to the touch electrodes of the touch sensing unit TSU and measures a charge change of a mutual capacitance of each of a plurality of touch nodes formed by the touch electrodes. For example, the touch driving circuit 400 measures a change in the capacitance of a plurality of touch nodes according to a change in the voltage or current amount of a touch detection signal received through the touch electrodes. In this way, the touch driving circuit 400 may determine whether the user touches, is proximal to, or does other interactions with respect to the display device 10 according to the charge change of the mutual capacitance of each of the plurality of touch nodes. The user's touch refers to direct contact of an object such as a user's finger or a pen with one surface of the cover window located on the touch sensing unit TSU. The user's proximity refers to the hovering of an object such as a user's finger or pen on one surface of the cover window.

The touch driving circuit 400 sets at least one of the touch electrodes and its connection line as a sensing reference line, and additionally supplies a touch driving signal to at least one sensing reference line. Then, the touch driving signal detected through the sensing reference line is set as a sensing reference signal. The touch driving circuit 400 may be responsive to touch detection signals when detected through the touch electrodes for compensating the voltage values of the touch detection signals according to differential voltages between the sensing reference signal and the touch detection signals. For more accurate compensation, the touch driving circuit 400 may turn to and apply another touch electrode and its connection line as the at least one sensing reference line according to a location where touch is made.

The touch driving circuit 400 may extract touch coordinates by correcting the touch detection signals according to the noise application level due to the low-temperature driving, the charging mode, the high-frequency application, the electromagnetic noise application state, etc., or it may switch the driving mode autonomously. For example, when determining the noise application state, the touch driving circuit 400 may perform a correction operation including a rejection to the touch detection signals in response to the detection or non-detection of a body part, a subject, or others supposed to be detected through human body detection sensors of the display panel 100. Additionally, the touch driving circuit 400 may detect a user's touch by selectively changing the touch sensing area in response to the detection or non-detection of a body part positioned forwardly of the display panel 100, and it may switch the driving mode to a low-power mode or a standby mode, etc.

Figure 4:
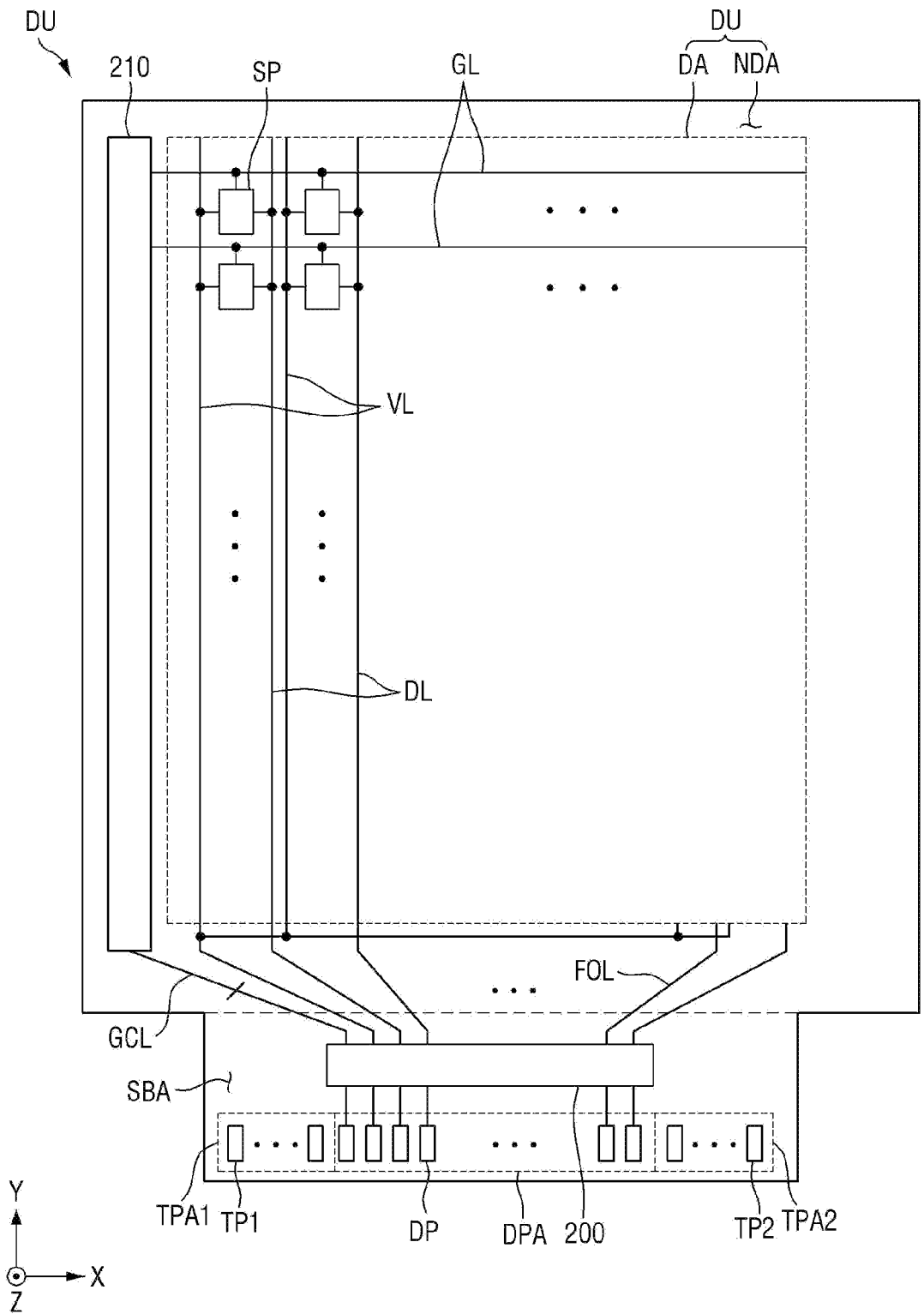
FIG. 4 is a schematic layout diagram of an example of the display panel shown in FIGS. 1 to 3 according to some embodiments.

FIG. 4 is a schematic layout diagram of an example of the display panel 100 shown in FIGS. 1 to 3. For example, FIG. 4 is a layout diagram illustrating the display area DA and the non-display area NDA of the display module DU before the touch sensing unit TSU is formed.

The display area DA is an area for displaying an image, and it may be defined as a central area of the display panel 100. The display area DA may include a plurality of pixels SP, a plurality of gate lines GL, a plurality of data lines DL, and a plurality of power lines VL. Each of the pixels SP may be defined as a minimum unit for emitting light.

The plurality of gate lines GL may supply the gate signal received from a gate driver 210 provided in the display panel 100 to the plurality of pixels SP. The gate lines GL may extend in the X-axis direction and may be spaced apart from each other in the Y-axis direction crossing the X-axis direction.

The plurality of data lines DL may supply the data voltage received from the display driving circuit 200 to the plurality of pixels SP. The data lines DL may extend in the Y-axis direction and may be spaced apart from each other in the X-axis direction.

The plurality of power lines VL may supply the power voltage received from the display driving circuit 200 to the plurality of pixels SP. Here, the power supply voltage may be at least one of a driving voltage, an initialization voltage, or a reference voltage. The plurality of power lines VL may extend in the Y-axis direction and may be spaced apart from each other in the X-axis direction.

The non-display area NDA may surround the display area DA. The non-display area NDA may include the gate driver 210, fan-out lines FOL, and gate control lines GCL. The gate driver 210 may generate a plurality of gate signals based on a gate control signal, and sequentially supply the plurality of gate signals to the plurality of gate lines GL according to a set order.

The fan-out lines FOL may extend from the display driving circuit 200 to the display area DA. The fan-out lines FOL may supply the data voltage received from the display driving circuit 200 to the plurality of data lines DL.

The gate control line GCL may extend from the display driving circuit 200 to the gate driver 210. The gate control line GCL may supply the gate control signal received from the display driving circuit 200 to the gate driver 210.

The sub-area SBA may include the display driving circuit 200, a display pad area DPA, and first and second touch-pad areas TPA1 and TPA2.

The display driving circuit 200 may output, to the fan-out lines FOL, signals and voltages for driving the display panel 100. The display driving circuit 200 may supply data voltages through the fan-out lines FOL to the data lines DL. The data voltages may be supplied to the plurality of pixels SP, and they may determine the luminance of the plurality of pixels SP. The display driving circuit 200 may supply a gate control signal through the gate control line GCL to the gate driver 210.

The display pad area DPA, the first touchpad area TPA1, and the second touchpad area TPA2 may be located at an edge of the sub-area SBA. The display pad area DPA, the first touchpad area TPA1, and the second touchpad area TPA2 may be electrically connected to the display circuit board 300 by using an anisotropic conductive film or a low-resistance high-reliability material such as SAP.

The display pad area DPA may include a plurality of display pad units. The plurality of display pad units may be connected through the display circuit board 300 to a main processor. The plurality of display pad units may be connected to the display circuit board 300 to receive digital video data, and they may supply digital video data to the display driving circuit 200.

Figure 5:
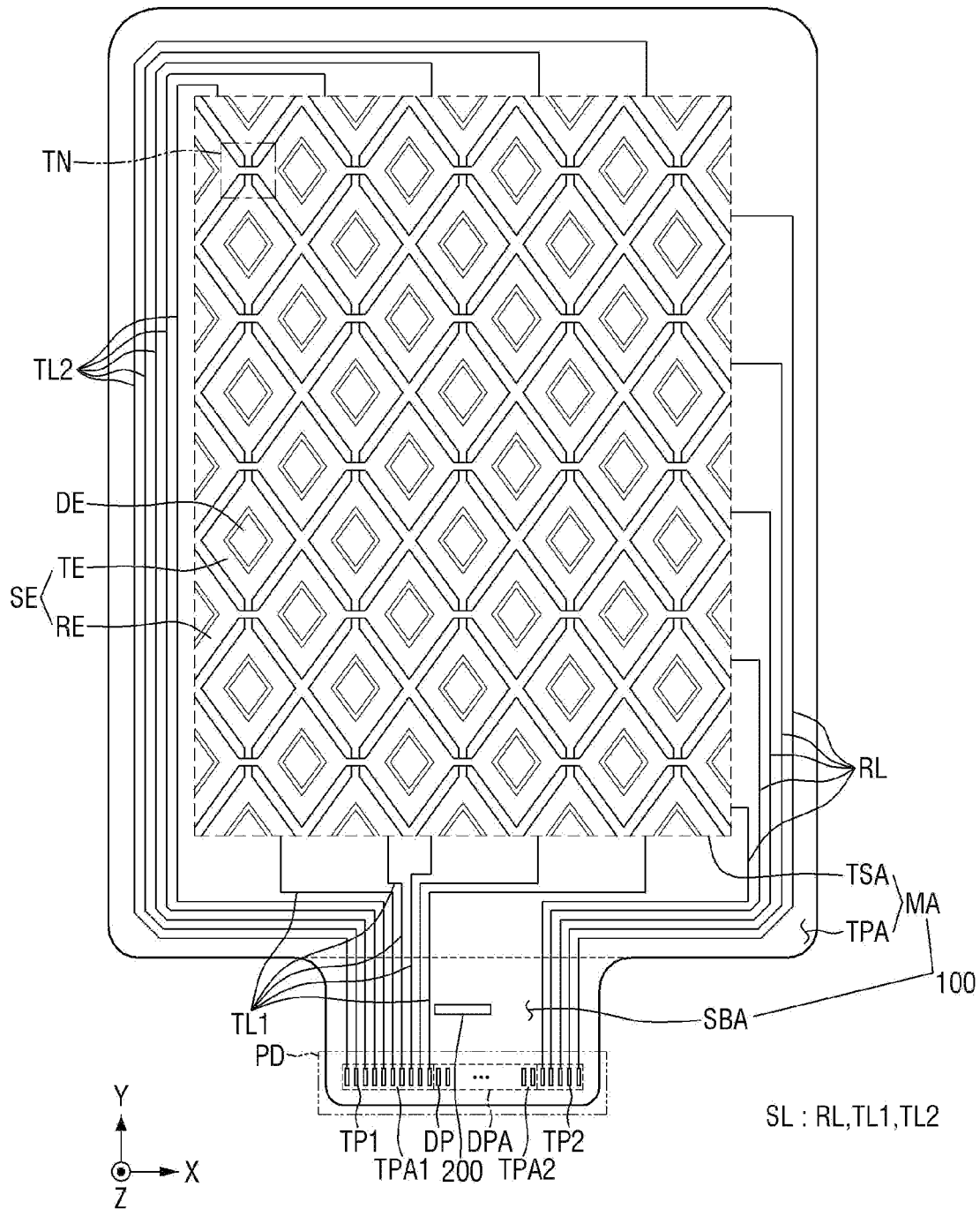
FIG. 5 is a schematic layout diagram of an example of the touch detection module shown in FIG. 3 according to some embodiments.

FIG. 5 is a schematic layout diagram of an example of the touch detection module shown in FIG. 3.

FIG. 5 illustrates that the touch electrodes SE of the main area MA include two types of electrodes, for example, driving electrodes TE and sensing electrodes RE and that the touch detection module operates in a mutual capacitance method in which touch driving signals are applied to the driving electrodes TE and then the sensing electrodes RE are used to detect a charge change of a mutual capacitance of each of a plurality of touch nodes, but embodiments according to the present disclosure are not limited thereto.

FIG. 5 illustrates, for convenience of description and illustration, just the driving electrodes TE, sensing electrodes RE, dummy patterns DE, touch lines SL, and first and second touch pads TP1 and TP2, but embodiments are not limited thereto.

Referring to FIG. 5, the main area MA of the touch sensing unit TSU includes the touch sensing area TSA for sensing a user's touch and a touch peripheral area TPA arranged around the touch sensing area TSA. The touch sensing area TSA may overlap the display area DA of FIGS. 1 to 3, and the touch peripheral area TPA may overlap the non-display area NDA.

Located in the touch sensing area TSA are the driving electrodes TE, sensing electrodes RE, and dummy patterns DE. The driving electrodes TE and the sensing electrodes RE may be electrodes for forming mutual capacitance to detect a touch of an object or a person.

The sensing electrodes RE may be arranged side by side in the first (X-axis) direction and the second (Y-axis) direction. The sensing electrodes RE may be electrically connected in the first (X-axis) direction. The sensing electrodes RE adjacent in the first (X-axis) direction may be electrically interconnected. The sensing electrodes RE adjacent in the second (Y-axis) direction may be electrically isolated from each other. This may generate a touch node TN having mutual capacitance to be placed at each of the intersections between the driving electrodes TE and the sensing electrodes RE. Multiple touch nodes TN may correspond to the intersections between the driving electrodes TE and the sensing electrodes RE.

The driving electrodes TE may be arranged side by side in the first (X-axis) direction and the second (Y-axis) direction. The driving electrodes TE adjacent in the first (X-axis) direction may be electrically isolated from each other. The driving electrodes TE may be electrically connected in the second (Y-axis) direction. The driving electrodes TE adjacent in the second (Y-axis) direction may be interconnected through separate connection electrodes.

The dummy patterns DE may each be arranged to be surrounded by the driving electrode TE or the sensing electrode RE. Each dummy pattern DE may be electrically separated from the driving electrode TE or the sensing electrode RE. Each dummy pattern DE may be arranged such that it spaced apart from the driving electrode TE or the sensing electrode RE. Each dummy pattern DE may be electrically floating.

FIG. 5 illustrates that each of the driving electrodes TE, the sensing electrodes RE, and the dummy patterns DE has a rhombus planar shape, but embodiments according to the present disclosure are not limited thereto. For example, each of the driving electrodes TE, the sensing electrodes RE, and the dummy patterns DE may be flat and have a quadrangle other than the rhombus, a polygon other than the quadrangle, a circle, or an ellipse.

The touch lines SL may be located in the sensor peripheral area TPA. The touch lines SL include first and second touch driving lines TL1 and TL2 connected to the driving electrodes TE, and the touch sensing lines RL connected to the sensing electrodes RE.

The respective sensing electrodes RE located at one end of the touch sensing area TSA may be connected one-to-one to the touch sensing lines RL. For example, as shown in FIG. 5, the respective sensing electrodes RE located at the right end among the sensing electrodes RE electrically connected in the first (X-axis) direction may be connected to the respective touch sensing lines RL. Additionally, the respective touch sensing lines RL may be connected one-to-one to the second touch pads TP2 located in a pad unit PD.

The driving electrodes TE located at one end of the touch sensing area TSA may be connected one-to-one to the first touch driving lines TL1, and the driving electrodes TE located at the other end of the touch sensing area TSA may be connected one-to-one to the second touch driving lines TL2. For example, among the driving electrodes TE electrically connected in the second (Y-axis) direction, the driving electrodes TE located at the lower end may be respectively connected to the first touch driving lines TL1, and the driving electrodes TE located at the upper end may be respectively connected to the second touch driving lines TL2. The second touch driving lines TL2 may be connected to the driving electrodes TE on the upper side of the touch sensing area TSA via the left outer side of the touch sensing area TSA.

The first touch driving lines TL1 and the second touch driving lines TL2 may be connected one-to-one to the first touch pads TP1 located in the pad unit PD. The driving electrodes TE are adapted to receive touch driving signals by being connected to the first and second touch driving lines TL1 and TL2 at both ends of the touch sensing area TSA. This can prevent or reduce instances of an RC delay of the touch driving signal incurring a discrepancy between the touch driving signals applied to the driving electrodes TE located on the lower side of the touch sensing area TSA and the touch driving signals applied to the electrodes TE located on the upper side of the touch sensing area TSA.

Where the display circuit board 300 is connected to one side of a flexible film as illustrated in FIGS. 1 to 3, the display pad area DPA, and the first and second touchpad areas TPA1 and TPA2 of the pad unit PD may correspond to pads of the display panel 100 connected to the display circuit board 300. Accordingly, the pads of the display panel 100 may be placed over and in contact with the display pads DP, the first touch pads TP1, and the second touch pads TP2. The display pads DP, the first touch pads TP1, and the second touch pads TP2 are formed using an anisotropic conductive film or a low-resistance high-reliability material such as SAP for the same pads to be electrically connected to the pads of the display circuit board 300. Therefore, the display pads DP, the first touch pads TP1, and the second touch pads TP2 may be electrically connected to the touch driving circuit 400 located on the display circuit board 300.

Figure 6:
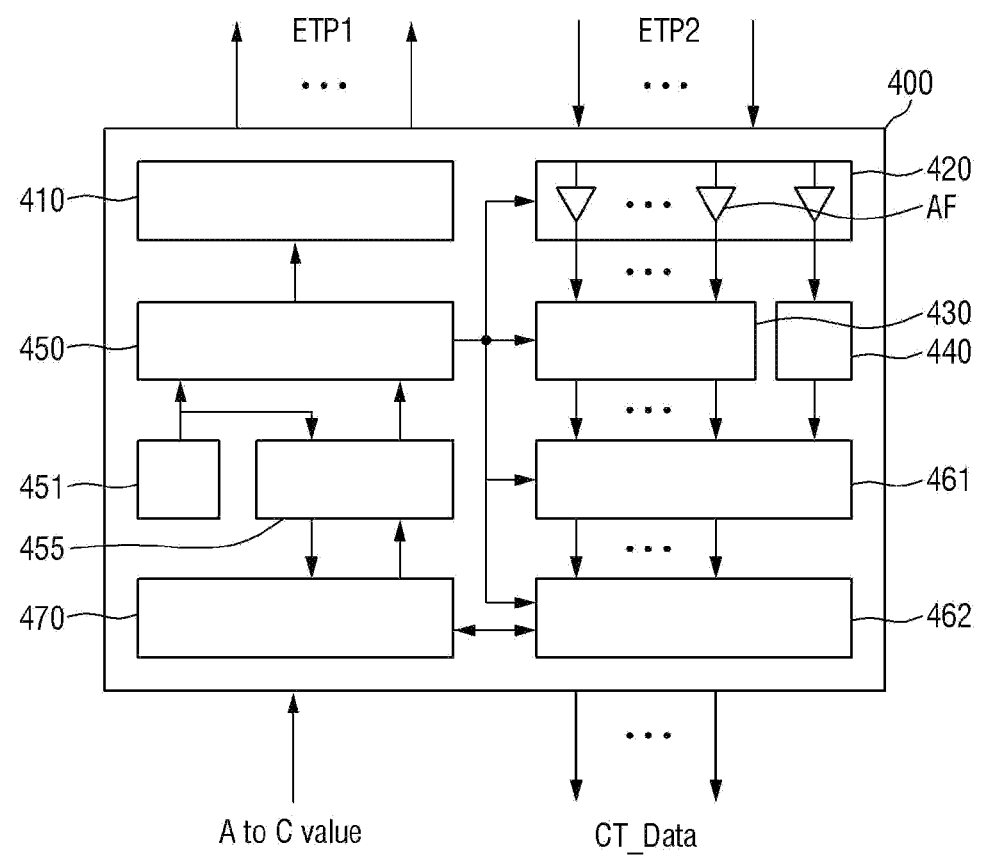
FIG. 6 is a detailed block diagram of a touch driving circuit illustrated in FIGS. 1 to 3 according to some embodiments.

FIG. 6 is a detailed block diagram of the touch driving circuit 400 illustrated in FIGS. 1 to 3.

Referring to FIG. 6, the touch driving circuit 400 includes a driving signal output unit (or driving signal output component) 410, a sensing circuit unit (or sensing circuit) 420, an analog-to-digital conversion unit (or analog-to-digital converter) 430, a current detection unit (or current detector) 440, a touch driving control unit (or touch driving controller) 450, a reference clock generation unit (or reference clock generator) 451, a reference clock detection unit (or reference clock detector) 455, a data storage unit (or data storage component) 470, a touch data generation unit (or touch data generator) 461, and a touch coordinate output unit (or touch coordinate generator) 462.

The driving signal output unit 410 supplies touch driving signals to the first touch pads TP1 and the driving electrodes TE of the touch detection module through first touch pogo pads ETP1.

The driving signal output unit 410 is responsive to a touch driving control signal from the touch driving control unit 450 for outputting touch driving signals to the driving electrodes TE overall, including the leftmost driving electrodes TE and the rightmost driving electrodes TE in the touch sensing area TSA. In this case, the driving signal output unit 410 may be responsive to the touch driving control signal for sequentially outputting touch driving signals to the driving electrodes TE including the leftmost and rightmost driving electrodes TE. Alternatively, the driving signal output unit 410 may be responsive to the touch driving control signal for grouping the driving electrodes TE into groups (e.g., a preset number of groups) and outputting touch driving signals for each group of the driving electrodes TE. For example, the touch driving signal may be supplied as a plurality of pulse signals generated with a magnitude in a range of about 1.8 V to 2.2 V.

The reference clock generation unit 451 generates reference clocks according to a preset reference frequency in response to an operation signal from the touch driving control unit 450. The reference clock generation unit 451 transmits the reference clocks of the reference frequency to the touch driving control unit 450 and the reference clock detection unit 455. For example, the reference clock generation unit 451 is responsive to an operation signal inputted from the touch driving control unit 450 for generating and transmitting reference clocks according to the preset reference frequency of 50 MHz to the touch driving control unit 450 and the reference clock detection unit 455.

The reference clock detection unit 455 receives the reference clocks transmitted from the reference clock generation unit 451 to the touch driving control unit 450 at the same time as they are received by the touch driving control unit 450. The reference clock detection unit 455 counts or monitors the reference clocks inputted from the touch driving control unit 450 in units of a preset period and detects frequencies of the reference clocks generated from the reference clock generation unit 451 in real-time. The reference clock detection unit 455 transmits frequency information on the real-time detected frequencies of the reference clocks to the touch driving control unit 450 and the data storage unit 470.

The data storage unit 470 stores frequency modulation parameters' set values (A to C-values) respectively corresponding to the frequency information items of reference clocks. The data storage unit 470 is responsive to the inputted frequency information of the reference clocks from the reference clock detection unit 455 or the touch driving control unit 450 for supplying the frequency modulation parameter set values corresponding to the inputted frequency information of the reference clocks to the touch driving control unit 450. Here, the frequency modulation parameter may be the generation periods of the reference clocks, and accordingly, the frequency modulation parameter set values may be period values of the reference clocks, which are obtained by setting the rising or falling periods of the reference clocks. Accordingly, the touch driving control unit 450 may be responsive to the frequency modulation parameter set value when updated or inputted from the data storage unit 470 for generating a touch driving period signal for each generation period of the reference clock, corresponding to the frequency modulation parameter set value, and modulating the frequency of the touch driving signal.

The touch driving control unit 450 controls the drive timing of the driving signal output unit 410, the sensing circuit unit 420, the analog-to-digital conversion unit 430, the touch data generation unit 461, and the touch coordinate output unit 462.

For example, the touch driving control unit 450 generates a touch driving control signal including a touch driving period signal by using the reference clock inputted from the reference clock generation unit 451 and the frequency modulation parameter set value. For example, the touch driving control unit 450 may count the reference clocks that are inputted sequentially, in correspondence with the frequency modulation parameter set values, thereby generating the touch driving period signal for each of the period counts of the reference clocks, and maintaining the frequency of the touch driving signal.

The touch driving control unit 450 supplies a touch driving control signal including a touch driving period signal in units of a preset period to the driving signal output unit 410, thereby controlling the driving signal output unit 410 to supply the touch driving signals to the driving electrodes TE. The driving signal output unit 410 may generate the touch driving signal to correspond to the generation period of the touch driving period signal and supply the generated touch driving signal to the first touch pads TP1 and the driving electrodes TE.

The sensing circuit unit 420 detects, through second touch pogo pads ETP2, a charge change of the mutual capacitance of each of the touch nodes TN from the touch sensing lines RL of the touch sensing unit TSU and the second touch pads TP2. The sensing circuit unit 420 may include operational amplifiers AF for sensing a charge change of the mutual capacitance of each of the touch nodes TN. The operational amplifiers AF may be connected one-to-one to the second touch pogo pads ETP2.

The analog-to-digital conversion unit 430 sequentially converts the amplified output voltages of the second touch pogo pads ETP2 from the operational amplifiers AF of the sensing circuit unit 420, that is, the output voltages due to the charge changes of the respective touch nodes TN, into touch data which is digital data.

The current detection unit 440 detects an amount of current from the signal amplified through the operational amplifier AF of the sensing circuit unit 420. The current detection unit 440 may detect the amount of current by using a current detector and share the detected current detection value with the touch data generation unit 461.

The touch data generation unit 461 sequentially receives, from the analog-to-digital conversion unit 430, touch data items for touch detection signals detected through the touch electrodes TE and the sensing electrode RE. The touch data generation unit 461 sequentially compares the touch data items for the touch detection signals with preset detection reference data. Then, the touch data generation unit 461 extracts and transmits a result of comparing the touch data items with the detection reference data, that is, the differential data values of the touch data items to the touch coordinate output unit 462.

The touch coordinate output unit 462 calculates and generates the touch position coordinates for the touch data items having their differential data values greater than the average value among the touch data items sequentially detected through the touch data generation unit 461 to supply the generated touch position coordinates to the display driving circuit 200.

Figure 7:
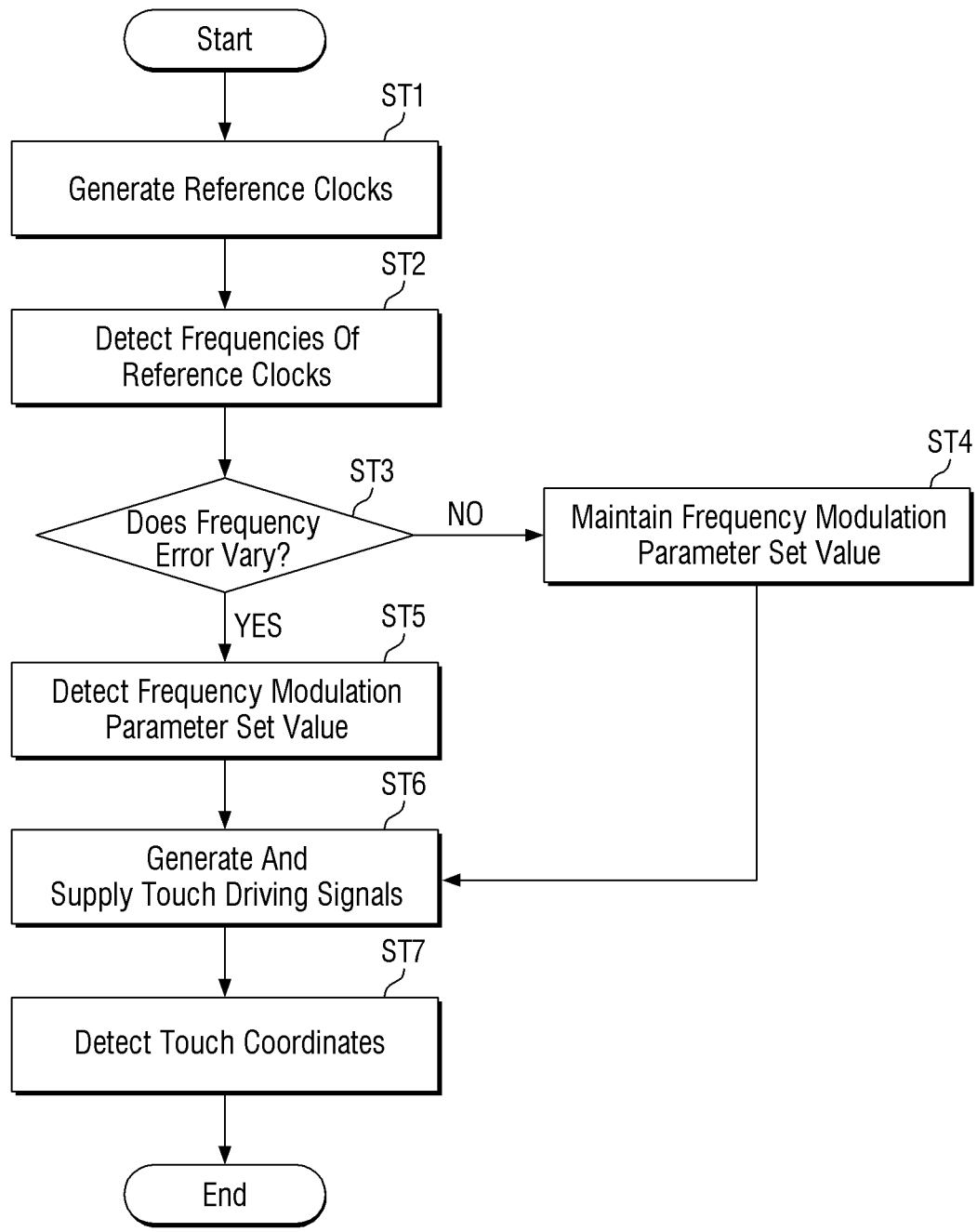
FIG. 7 is a sequential flowchart of an operation sequence of the touch driving circuit illustrated in FIG. 6 according to some embodiments.

FIG. 7 is a flowchart illustrating aspects of an operation sequence of the touch driving circuit 400 illustrated in FIG. 6. Although FIG. 7 illustrates various operations according to some embodiments, embodiments according to the present disclosure are not limited thereto, and in some embodiments, the order of operations may vary, or there may be additional operations or fewer operations without departing from the spirit and scope of embodiments according to the present disclosure.

Referring to FIG. 7, the touch driving control unit 450 may supply an operation signal to the reference clock generation unit 451 as a start signal for performing a touch sensing operation. Accordingly, the reference clock generation unit 451 may be responsive to the operation signal from the touch driving control unit 450 for generating and outputting reference clocks according to a preset reference frequency. For example, the reference clock generation unit 451 may generate reference clocks on a preset reference frequency of 50 MHz and transmit them to the touch driving control unit 450 and the reference clock detection unit 455 (Step ST1).

The reference clock detection unit 455 counts, in units of a preset period, the reference clocks transmitted from the reference clock generation unit 451 to the touch driving control unit 450 to detect frequencies of the reference clocks in real-time. The reference clock detection unit 455 may transmit the reference clocks' frequency information detected in real-time to the touch driving control unit 450 and the data storage unit 470 (ST2).

The touch driving control unit 450 compares the reference clocks' frequency information inputted from the reference clock detection unit 455 with the previously stored frequency information (or reference frequency information) to determine whether the frequency of the reference clocks is changed, that is, whether there is a frequency error variation of the reference clocks. (ST3)

When the frequency of the reference clocks does not change, the touch driving control unit 450 maintains a frequency modulation parameter set value corresponding to pre-stored frequency information (or reference frequency information) or reads the same from the data storage unit 470. (ST4)

On the other hand, when the frequency information of the additionally inputted reference clocks varies compared to the pre-stored frequency information (or reference frequency information), the touch driving control unit 450 reads, from the data storage unit 470, the frequency modulation parameter set value corresponding to the frequency information of the additionally inputted reference clocks. (ST5).

Figures 8, 9:
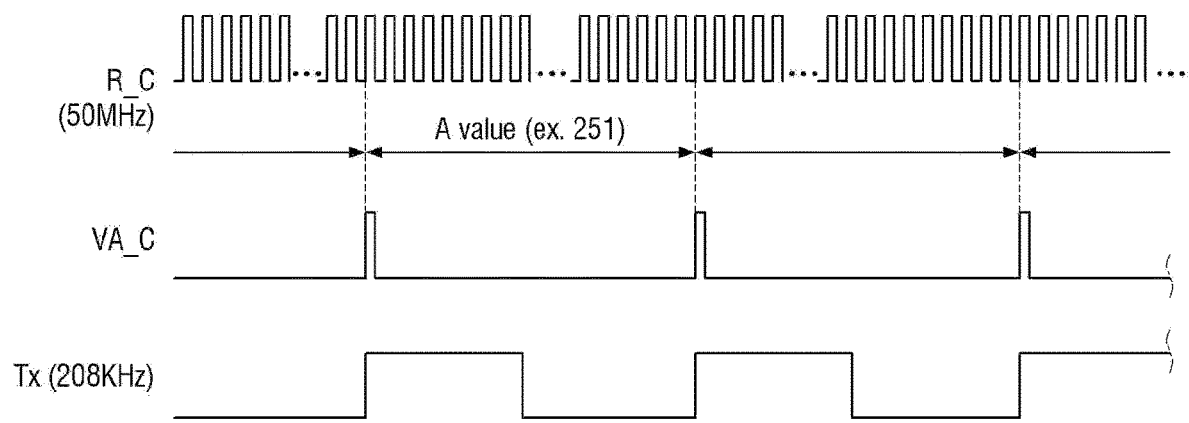
FIG. 8 is a diagram illustrating frequency modulation parameter set values and frequency modulation characteristics of touch driving signals according to some embodiments.
FIG. 9 is a waveform diagram illustrating reference clocks and generation periods of touch driving signals in a touch driving circuit according to some embodiments.

FIG. 8 is a diagram illustrating frequency modulation parameter set values and frequency modulation characteristics of touch driving signals. FIG. 9 is a waveform diagram illustrating reference clocks and generation periods of touch driving signals in the touch driving circuit 400.

As shown in FIGS. 8 and 9, in the data storage unit 470, stored are frequency modulation parameter set values (e.g., A to B-values of 249 to 251) corresponding respectively to frequency information (e.g., 49 MHz to 51 MHz) of the reference clocks R_C. The frequency modulation parameter set value may be the generation period set value (or generation period count value) of the reference clocks R_C.

The data storage unit 470 may be responsive to a real-time input of the frequency information (e.g., 49 MHz to 51 MHz) of the reference clock from the reference clock detection unit 455 or the touch driving control unit 450 for supplying the touch driving control unit 450 with any one frequency modulation parameter set value (e.g., one of A to B-values 249 to 251) corresponding to the inputted frequency information of the reference clock.

Referring to FIG. 9, the generation periods of the reference clocks R_C are repetitive rising or falling periods of the reference clocks R_C, and the touch driving control unit 450 may count the repetitive rising or falling periods of the reference clocks.

The touch driving control unit 450 is responsive to any one frequency modulation parameter set value (e.g., one of A to B-values 249 to 251) when maintained or newly inputted, for generating the touch driving period signal VA_C for each generation period (e.g., A-value 251) of the reference clock R_C corresponding to the frequency modulation parameter set value.

In other words, the touch driving control unit 450 counts the sequentially inputted reference clocks R_C in correspondence with the frequency modulation parameter set value (e.g., A-value 251) and thereby generates the touch driving period signal VA_C for each of the period counts of the reference clock R_C. Then, the touch driving control unit 450 supplies the touch driving control signal including the touch driving period signal VA_C to the driving signal output unit 410. Accordingly, the driving signal output unit 410 generates the touch driving signal Tx (208 kHz) based on the generation period of the touch driving period signal VA_C and supplies the touch driving signal Tx (208 kHz) to the first touch pads TP1 and the driving electrodes TE. (ST6)

The touch data generation unit 461 sequentially receives the touch data items for the touch detection signals from the analog-to-digital conversion unit 430, compares the touch data items with preset detection reference data, and transmits differential data values of the touch data items to the touch coordinate output unit 462. Accordingly, the touch coordinate output unit 462 may calculate and generate the touch position coordinates for the touch data items having large differential data values among the touch data items sequentially detected through the touch data generation unit 461 (ST7).

Figure 10:
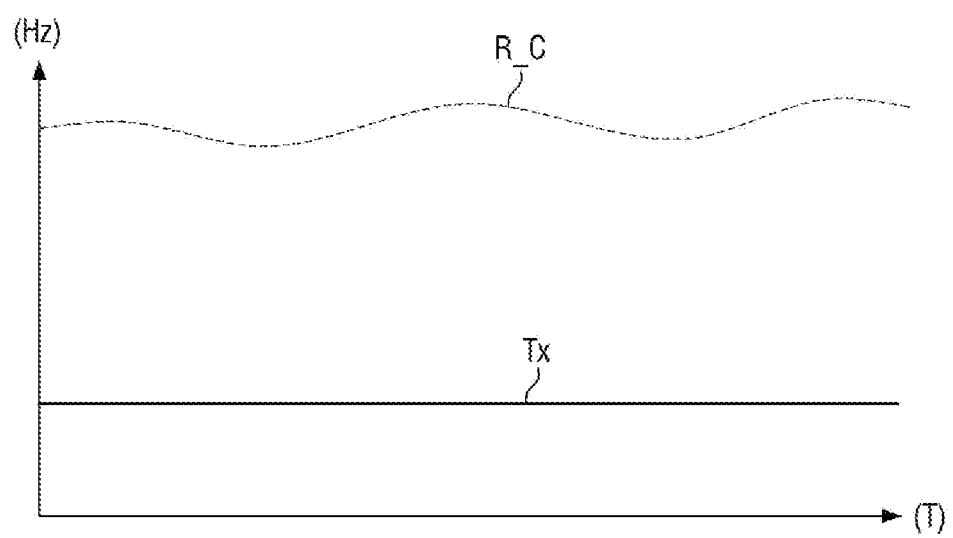
FIG. 10 is a graph illustrating changes in the frequency of reference clocks and touch driving signals in a touch driving circuit according to some embodiments.

FIG. 10 is a graph illustrating changes in the frequency of reference clocks and touch driving signals in a touch driving circuit.

The touch driving control unit 450 is responsive to variations of the frequency information of the reference clocks R_C for reading, from the data storage unit 470, a frequency modulation parameter set value, e.g., one of A to B-values of 249 to 251. Additionally, the touch driving control unit 450 counts the sequentially inputted reference clocks R_C in correspondence with a newly varied frequency modulation parameter set value, e.g., A-value 251. Counting the reference clocks R_C by using the newly varied frequency modulation parameter set value can keep the driving frequencies of the touch driving period signal VA_C and the touch driving signal Tx (208 kHz) constant even when the frequency of the reference clocks R_C varies as shown in FIG. 10.

Figure 11:
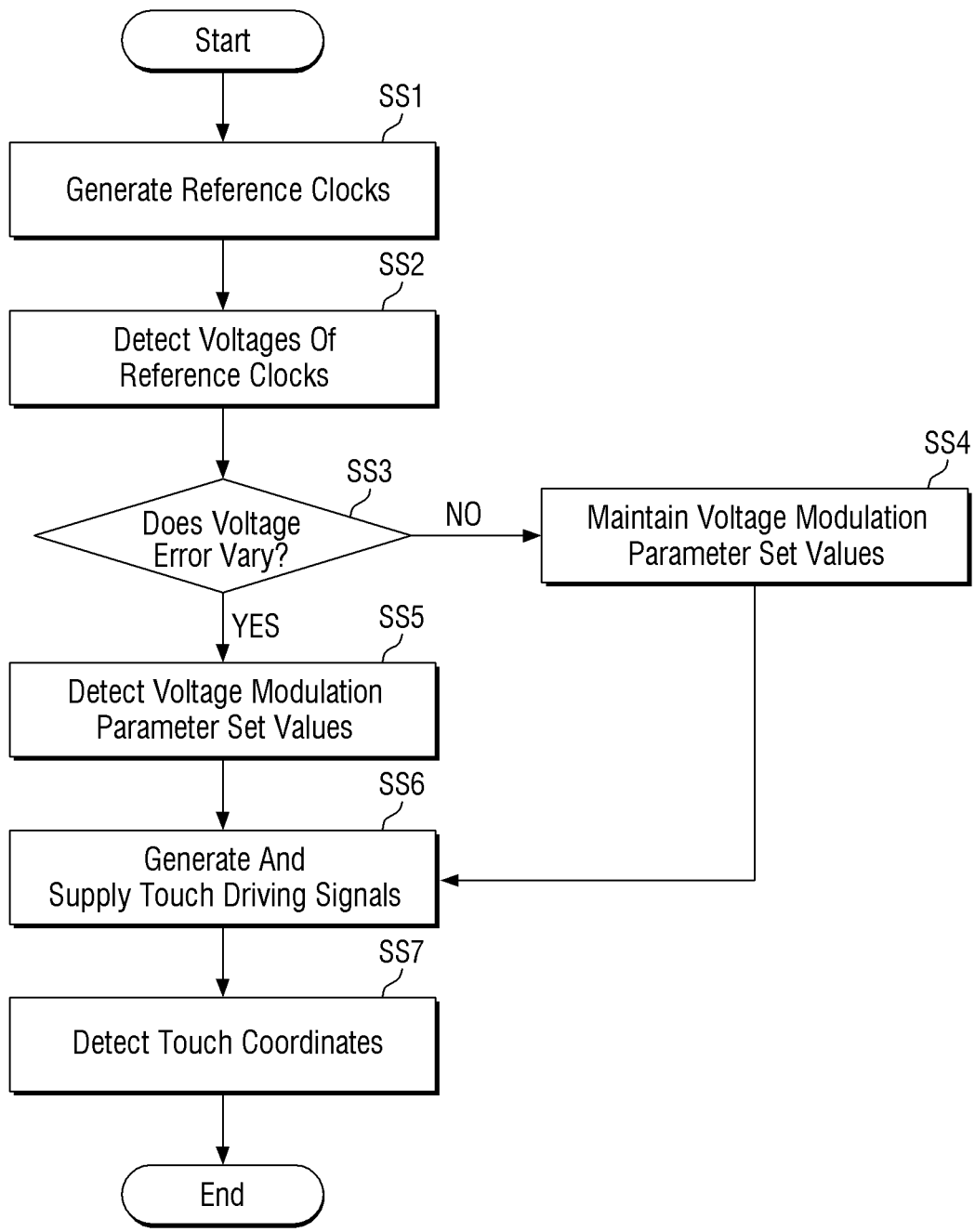
FIG. 11 is another sequential flowchart of an operation sequence of the touch driving circuit illustrated in FIG. 6 according to some embodiments.

FIG. 11 is another sequential flowchart of an operation sequence of the touch driving circuit 400 illustrated in FIG. 6.

Referring to FIG. 11 along with FIG. 6, the reference clock generation unit 451 may be responsive to an operation signal inputted from the touch driving control unit 450 for generating the reference clocks at a preset reference voltage level (e.g., 1 V) and transmitting the generated reference clocks to the touch driving control unit 450 and the reference clock detection unit 455.

The reference clock detection unit 455 counts or monitors, in a preset period unit, the reference clocks transmitted from the reference clock generation unit 451 to the touch driving control unit 450 and thereby detects the voltage levels of the reference clocks in real-time. The reference clock detection unit 455 transmits information on the voltage levels of the reference clocks detected in real-time to the touch driving control unit 450 and the data storage unit 470.

The data storage unit 470 stores voltage modulation parameter set values respectively corresponding to the voltage level information items of the reference clocks. The data storage unit 470 is responsive to inputted voltage level information items of the reference clocks from the reference clock detection unit 455 or the touch driving control unit 450 for supplying the data storage unit 470 with the voltage modulation parameter set values corresponding to the inputted voltage level information items of the reference clocks. Here, the voltage modulation parameter set values may be compensation values for voltage amplitude modulation of the reference clocks. Accordingly, the touch driving control unit 450 may be responsive to an input or update of a voltage modulation parameter set value for generating a touch driving period signal with a voltage level after further compensation by the voltage modulation parameter set value. For example, the touch driving control unit 450 may compensate the voltage level of the reference clock inputted from the reference clock generation unit 451 with the voltage level of the voltage modulation parameter set value, thereby setting and outputting the voltage level of the touch driving period signal.

The touch driving control unit 450 controls to supply, in units of a preset period, the touch driving period signal with its voltage level compensated and the touch driving control signal to the driving signal output unit 410, thereby allowing the driving signal output unit 410 to supply touch driving signals to the driving electrodes TE. The driving signal output unit 410 may generate a touch driving signal according to the voltage level of the touch driving period signal, and supply the generated touch driving signal to the first touch pads TP1 and the driving electrodes TE.

Referring to FIG. 11, the touch driving control unit 450 may supply an operation signal to the reference clock generation unit 451. Accordingly, the reference clock generation unit 451 may be responsive to the operation signal from the touch driving control unit 450 for generating and outputting reference clocks according to a preset reference voltage level. For example, the reference clock generation unit 451 may generate reference clocks with a preset reference voltage level of 1 V and transmit the generated reference clocks to the touch driving control unit 450 and the reference clock detection unit 455 (SS1).

The reference clock detection unit 455 detects voltage levels of reference clocks transmitted to the touch driving control unit 450. The reference clock detection unit 455 may transmit voltage level information of the reference clocks detected in real-time to the touch driving control unit 450 and the data storage unit 470 (SS2).

The touch driving control unit 450 compares the voltage level information of the reference clocks inputted from the reference clock detection unit 455 with the pre-stored reference voltage level information to determine whether the voltage of the reference clocks changes, that is, check whether or not there is a voltage error change of the reference clocks (SS3).

Unless the voltage level of the reference clocks changes, the touch driving control unit 450 lets the pre-stored voltage modulation parameter set value maintain or reads a new voltage modulation parameter set value from the data storage unit 470 (SS4).

On the other hand, when the voltage level information of the additionally inputted reference clocks varies compared to the pre-stored voltage level information, the touch driving control unit 450 reads, from the data storage unit 470, the voltage modulation parameter set value corresponding to the voltage level information of the additionally inputted reference clocks. (SS5).

FIG. 12 is a diagram illustrating voltage modulation parameter set values and voltage modulation characteristics of touch driving signals. FIG. 13 is a waveform diagram illustrating generation periods and voltage levels of the reference clocks and the touch driving signals in the touch driving circuit.

As shown in FIGS. 12 and 13, in the data storage unit 470, stored are voltage modulation parameter set values (e.g., A to B-values 1.9 V to 2.1 V) corresponding respectively to voltage level information (e.g., 0.9 V to 1.1 V) of the reference clocks R_C. The voltage modulation parameter set value may be an additional compensation voltage value for the reference clocks R_C.

The data storage unit 470 is responsive to a real-time input of the voltage information (e.g., 0.9 V to 1.1 V) of the reference clock from the reference clock detection unit 455 or the touch driving control unit 450 for supplying the touch driving control unit 450 with any one voltage modulation parameter set values (e.g., one of A to B-values of 1.9 V to 2.1 V) corresponding to the inputted voltage information of the reference clock.

The touch driving control unit 450 is responsive to any one voltage modulation parameter set value (e.g., one of A to B-values of 1.9 V to 2.1 V) when maintained or newly inputted, for setting the voltage level of the touch driving signal Tx (2.0 V) by compensating the voltage level of the reference clock R_C with the voltage modulation parameter set value. Accordingly, the driving signal output unit 410 generates the touch driving signal Tx (2.0 V) based on the voltage level setting information of the touch driving signal Tx (2.0 V) and supplies the generated touch driving signal Tx to the first touch pads TP1 and the driving electrodes TE. (SS6)

The touch data generation unit 461 sequentially receives the touch data items for the touch detection signals from the analog-to-digital conversion unit 430, compares the touch data items with preset detection reference data, and transmits differential data values of the touch data items to the touch coordinate output unit 462. Accordingly, the touch coordinate output unit 462 may calculate and generate the touch position coordinates for the touch data items having large differential data values among the touch data items sequentially detected through the touch data generation unit 461 (SS7).

FIG. 14 is a graph illustrating voltage changes of reference clocks and touch driving signals in a touch driving circuit.

As described above, the touch driving control unit 450 is still responsive to varying voltage levels of the reference clocks R_C, for reading, from the data storage unit 470, a voltage modulation parameter set value (e.g., one of A to B-values of 1.9V to 2.1V) that corresponds to the varied voltage level information of the reference clocks R_C. Then, the touch driving control unit 450 sets the voltage level of the touch driving signal by compensating the voltage of the sequentially inputted reference clocks R_C with the voltage level according to the voltage modulation parameter set value. Accordingly, as shown in FIG. 14, even with voltage level variations of the reference clocks R_C, the voltage levels of the touch driving period signal VA_C and the touch driving signals Tx can be maintained constant.

Figure 15:
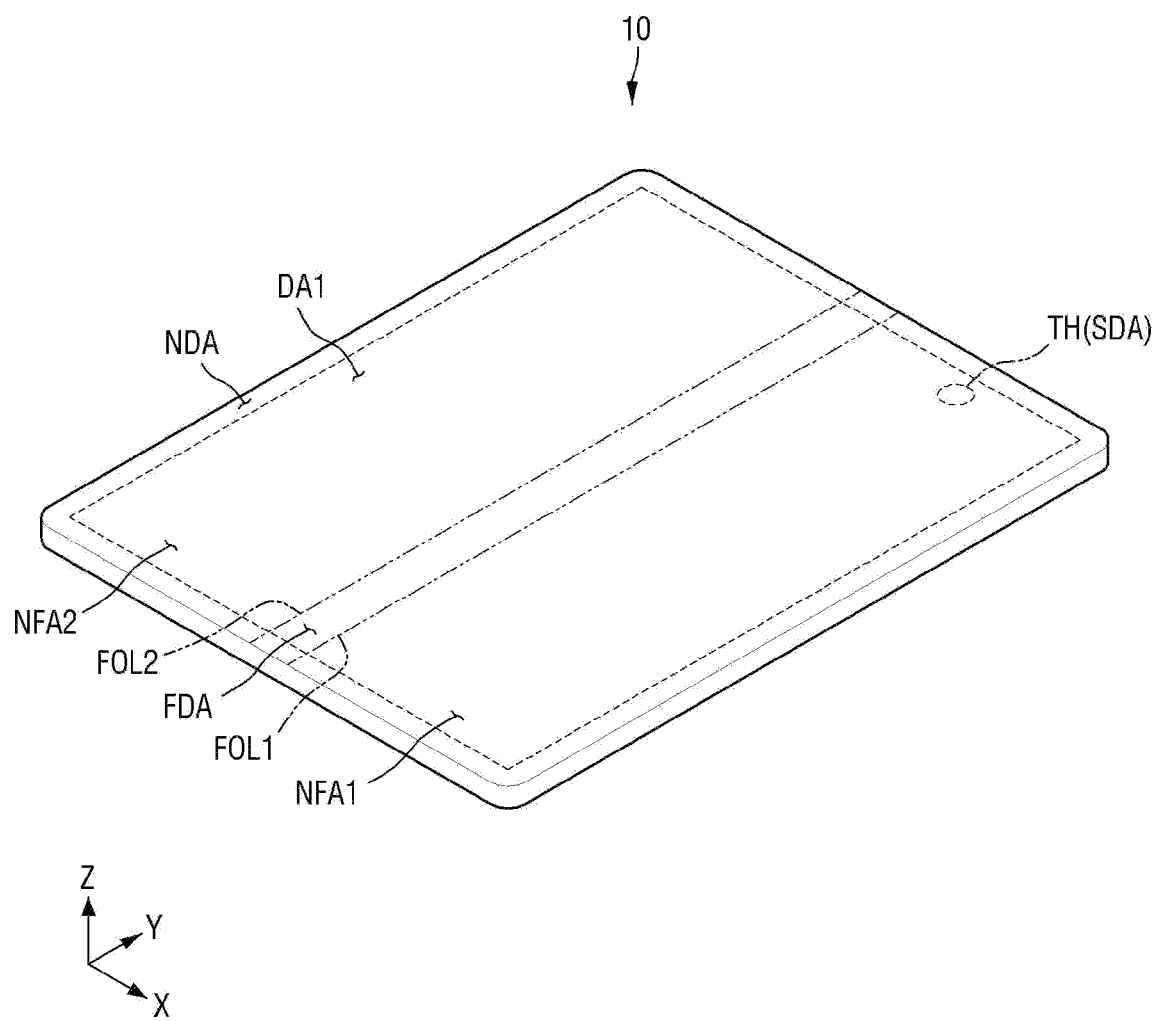
FIGS. 15 and 16 are perspective views of a display device according to some embodiments of the present disclosure.
Figure 16:
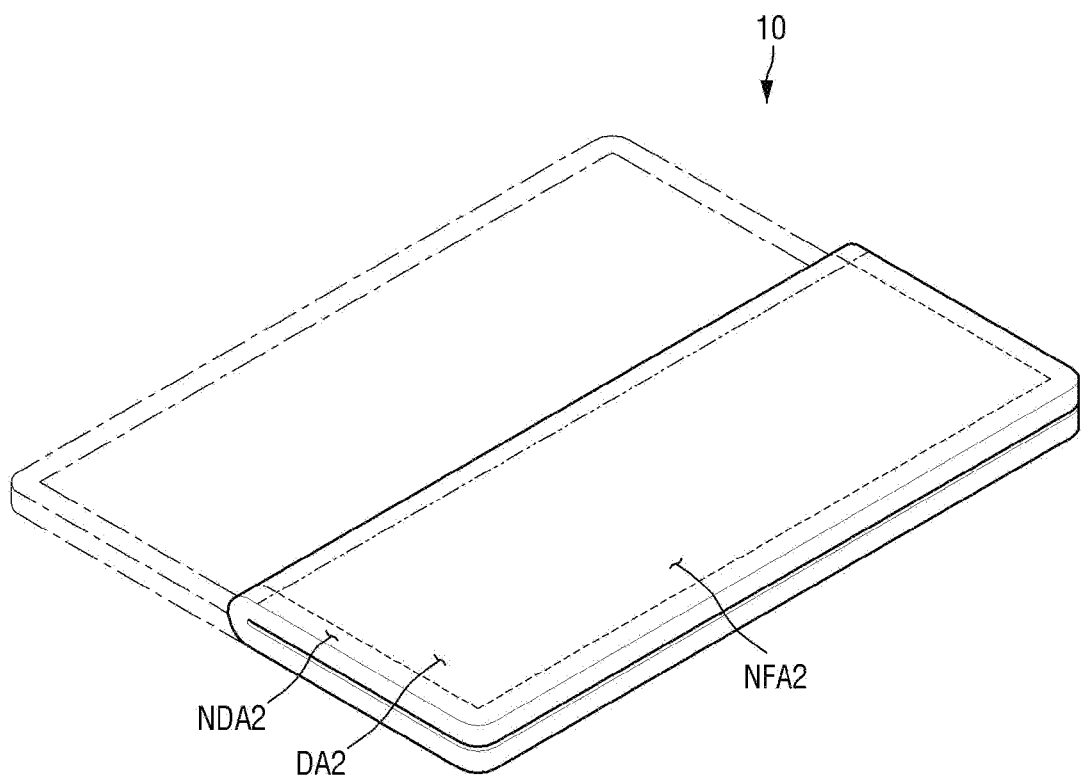

FIGS. 15 and 16 are perspective views of a display device 10 according to some embodiments of the present disclosure.

FIGS. 15 and 16 illustrate the display device 10 as a foldable display device that is folded in the first (X-axis) direction. The display device 10 may maintain both a folded state and an unfolded state. The display device 10 may be folded in an in-folding manner in which front surfaces are located inside. When the display device 10 is bent or folded in an in-folding manner, the front surfaces of the display device 10 may be arranged to face each other. Alternatively, the display device 10 may be folded in an out-folding manner in which the front surfaces are located on the outside. When the display device 10 is bent or folded in the out-folding manner, the rear surfaces of the display device 10 may be arranged to face each other.

The display device 10 may have a first non-folding area NFA1 and a folding area FDA with the first non-folding area NFA1 located on one side, for example, on the right side of the folding area FDA. A second non-folding area NFA2 may be located on the other side, for example, on the left side of the folding area FDA. The touch sensing unit TSU according to the embodiments of the present specification may be formed and located on the first non-folding area NFA1 and the second non-folding area NFA2, respectively.

A first folding line FOL1 and a second folding line FOL2 are provided extending in the second (Y-axis) direction, and the display device 10 may be folded in the first (X-axis) direction. This can approximately halve the length of the display device 10 in the first (X-axis) direction, allowing the user to conveniently carry the display device 10.

Meanwhile, the extending direction of the first folding line FOL1 and the extending direction of the second folding line FOL2 are not limited to the second (Y-axis) direction. For example, the first folding line FOL1 and the second folding line FOL2 may extend in the first (X-axis) direction, and the display device 10 may be folded in the second (Y-axis) direction. This may approximately halve the length of the display device 10 in the second (Y-axis) direction. Alternatively, the first folding line FOL1 and the second folding line FOL2 may extend in a diagonal direction of the display device 10 corresponding to an extension between the first (X-axis) direction and the second (Y-axis) direction. This allows the display device 10 to be folded in a triangular shape.

When the first folding line FOL1 and the second folding line FOL2 extend in the second (Y-axis) direction, the length of the folding area FDA in the first (X-axis) direction may be shorter than the length in the second (Y-axis) direction. Additionally, the length of the first non-folding area NFA1 in the first (X-axis) direction may be longer than the length of the folding area FDA in the first (X-axis) direction. The length of the second non-folding area NFA2 in the first (X-axis) direction may be longer than the length of the folding area FDA in the first (X-axis) direction.

A first display area DA1 may be located on the front surface of the display device 10. The first display area DA1 may overlap the folding area FDA, the first non-folding area NFA1, and the second non-folding area NFA2. Therefore, when the display device 10 is unfolded, an image may be displayed forwardly of the folding area FDA, the first non-folding area NFA1, and the second non-folding area NFA2 of the display device 10.

A second display area DA2 may be located on the rear surface of the display device 10. The second display area DA2 may overlap the second non-folding area NFA2. Therefore, when the display device 10 is folded, an image may be displayed forwardly of the second non-folding area NFA2 of the display device 10.

FIGS. 15 and 16 illustrate that the first non-folding area NFA1 is arranged with a through-hole TH in which a camera SDA is formed, but embodiments according to the present disclosure are not limited thereto. The through-hole TH or the camera SDA may be located in the second non-folding area NFA2 or the folding area FDA.

Figure 17:
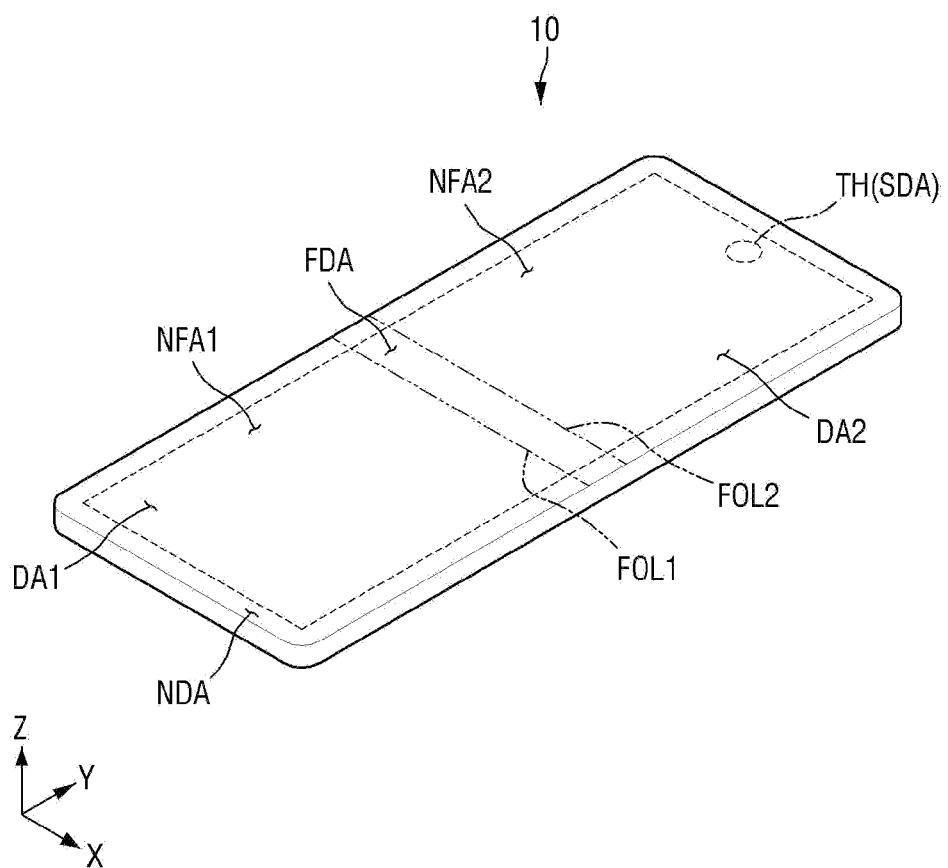
FIGS. 17 and 18 are perspective views of a display device according to some embodiments of the present disclosure.
Figure 18:
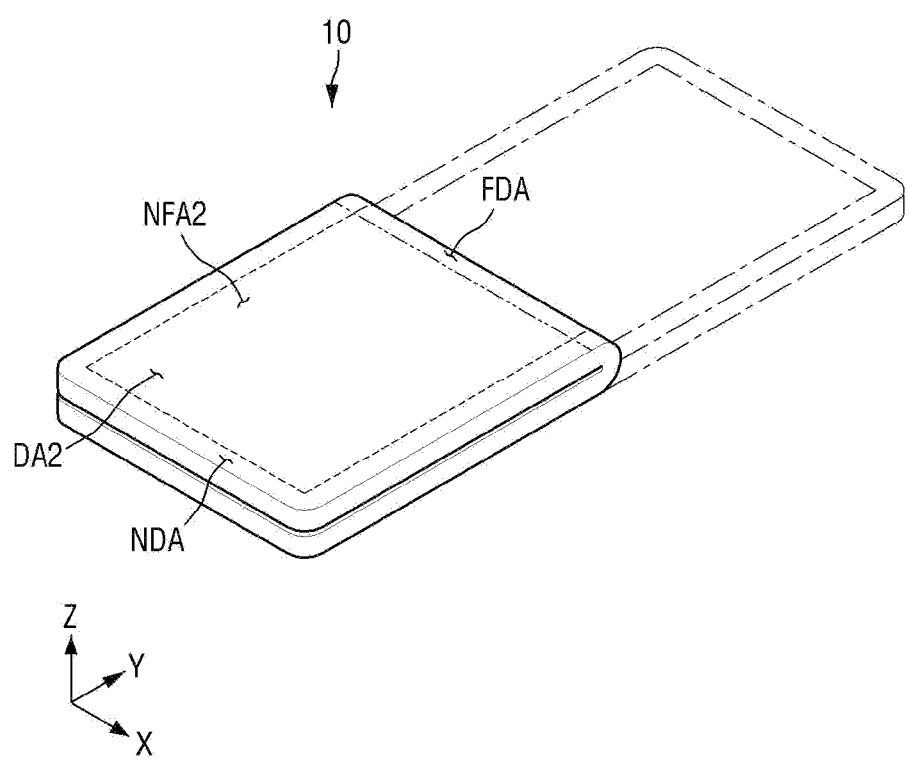

FIGS. 17 and 18 are perspective views of a display device 10 according to some embodiments of the present disclosure.

FIGS. 17 and 18 illustrate the display device 10 as a foldable display device that is folded in the second (Y-axis) direction. The display device 10 may maintain both a folded state and an unfolded state. The display device 10 may be folded in an in-folding manner in which front surfaces are located inside. When the display device 10 is bent or folded in an in-folding manner, the front surfaces of the display device 10 may be located to face each other. Alternatively, the display device 10 may be folded in an out-folding manner in which the front surfaces are located on the outside. When the display device 10 is bent or folded in an out-folding manner, the rear surfaces of the display device 10 may be arranged to face each other.

The display device 10 may include a folding area FDA, a first non-folding area NFA1, and a second non-folding area NFA2. The folding area FDA may be an area in which the display device 10 is folded, and the first non-folding area NFA1 and the second non-folding area NFA2 may be areas in which the display device 10 is not folded. The first non-folding area NFA1 may be located on one side, for example, a lower side of the folding area FDA. The second non-folding area NFA2 may be located on the other side, for example, the upper side of the folding area FDA.

The touch sensing unit TSU according to the embodiments of the present specification may be formed and located on the first non-folding area NFA1 and the second non-folding area NFA2, respectively.

On the other hand, the folding area FDA may be an area bent at a curvature (e.g., a set or predetermined curvature) in a first folding line FOL1 and a second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in the first (X-axis) direction as shown in FIGS. 17 and 18, and the display device 10 may be folded in the second (Y-axis) direction. This can approximately halve the length of the display device 10 in the second (Y-axis) direction, facilitating the user carrying the display device 10.

Meanwhile, the extending direction of the first folding line FOL1 and the extending direction of the second folding line FOL2 are not limited to the first (X-axis) direction. For example, the first folding line FOL1 and the second folding line FOL2 may extend in the second (Y-axis) direction, and the display device 10 may be folded in the first (X-axis) direction. This can approximately halve the length of the display device 10 in the first (X-axis) direction. Alternatively, the first folding line FOL1 and the second folding line FOL2 may extend in a diagonal direction of the display device 10 corresponding to an extension between the first (X-axis) direction and the second (Y-axis) direction. This allows the display device 10 to be folded in a triangular shape.

When the first folding line FOL1 and the second folding line FOL2 extend in the first (X-axis) direction as shown in FIGS. 17 and 18, the length of the folding area FDA in the second (Y-axis) direction may be shorter than the length thereof in the first (X-axis) direction. Additionally, the length of the first non-folding area NFA1 in the second (Y-axis) direction may be longer than the length of the folding area FDA in the second (Y-axis) direction. The length of the second non-folding area NFA2 in the second (Y-axis) direction may be longer than the length of the folding area FDA in the second (Y-axis) direction.

A first display area DA1 may be located on the front surface of the display device 10. The first display area DA1 may overlap the folding area FDA, the first non-folding area NFA1, and the second non-folding area NFA2. Therefore, when the display device 10 is unfolded, an image may be displayed forwardly of the folding area FDA, the first non-folding area NFA1, and the second non-folding area NFA2 of the display device 10.

A second display area DA2 may be located on the rear surface of the display device 10. The second display area DA2 may overlap the second non-folding area NFA2. Therefore, when the display device 10 is folded, an image may be displayed forwardly of the second non-folding area NFA2 of the display device 10.

FIGS. 17 and 18 illustrate that the second non-folding area NFA2 is arranged with a through-hole TH in which a camera SDA is located, but embodiments according to the present disclosure are not limited thereto. The through-hole TH may be located in the first non-folding area NFA1 or the folding area FDA.

According to embodiments of the present disclosure, a touch detection module and a display device including the same can constantly (or regularly or repeatedly) generate a frequency of touch driving signals supplied to touch electrodes, thereby preventing or reducing instances of a touch sensing error of the touch detection module and providing relatively improved accuracy of the touch detection.

Additionally, the touch detection module and the display device including the same according to some embodiments of the present disclosure can secure the operating condition margin of the touch electrodes and the frequency range of the touch driving signals, thereby improving the production yield of the touch detection module.

The electronic or electric devices and/or any other relevant devices or components according to embodiments of the present invention described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

However, the effects of the embodiments are not restricted to the ones set forth herein. The above and other effects of the embodiments will become more apparent to one of daily skill in the art to which the embodiments pertain by referencing the claims, and their equivalents.

In concluding the detailed description, those skilled in the art will appreciate that many variations and modifications can be made to the embodiments without substantially departing from the principles of the present invention. Therefore, the disclosed preferred embodiments of the invention are used in a generic and descriptive sense only and not for purposes of limitation.

What is claimed is:

1. A touch detection module, comprising:
a plurality of driving electrodes arranged side by side;
a plurality of sensing electrodes staggered with respect to the driving electrodes; and
a touch driving circuit configured to supply touch driving signals to the plurality of driving electrodes and to detect touch detection signals through the plurality of sensing electrodes to identify touch position coordinates,
wherein the touch driving circuit is configured:
to vary frequency modulation parameter set values in response to a change in a frequency of reference clocks, and
to generate and supply a frequency of the touch driving signals by using the reference clocks and a varied frequency modulation parameter set value.

2. The touch detection module of claim 1, wherein the touch driving circuit comprises:
a reference clock generator configured to generate the reference clocks based on a preset reference frequency;
a reference clock detector configured to generate frequency information items of the reference clocks in real-time;
a data storage component configured to store and share frequency modulation parameter set values respectively corresponding to the frequency information items of the reference clocks;
a touch driving controller configured to read in real-time, from the data storage component, the frequency modulation parameter set values corresponding to the frequency information items of the reference clocks, and to generate a touch driving period signal according to the reference clocks and the frequency modulation parameter set values; and
a driving signal output component configured to generate the touch driving signals in response to information on a generation period of the touch driving period signal, and to supply the touch driving signals to the plurality of driving electrodes.

3. The touch detection module of claim 2, wherein the touch driving circuit further comprises:
a sensing circuit configured to detect the touch detection signals through the plurality of sensing electrodes;
an analog-to-digital converter configured to sequentially convert the touch detection signals into touch data items;
a touch data generator configured to calculate differential data values of the touch data items by comparing the touch data items with preset detection reference data; and
a touch coordinate output component configured to calculate the touch position coordinates for the touch data items having large differential data values among the touch data items sequentially detected through the touch data generator.

4. The touch detection module of claim 2, wherein the frequency modulation parameter set values comprise period values of the reference clocks, the period values being obtained by setting rising or falling periods of the reference clocks, and
wherein the touch driving controller is configured to generate the touch driving period signal for each generation period of the reference clocks according to the frequency modulation parameter set values to maintain frequencies of the touch driving period signal and the touch driving signals.

5. The touch detection module of claim 2, wherein the touch driving controller is configured to count the reference clocks that are inputted sequentially, in correspondence with the frequency modulation parameter set values, to generate the touch driving period signal for each of period counts of the reference clocks and to maintain the frequency of the touch driving signals.

6. The touch detection module of claim 2, wherein the touch driving controller is configured
to compare frequency information of the reference clocks inputted from the reference clock detector with pre-stored frequency information or reference frequency information to determine the reference clocks have a frequency error subjected to a variation, and
to be responsive to variations of the frequency information items of the reference clocks for reading, from the data storage component, frequency modulation parameter set values corresponding to varied frequency information items of the reference clocks.

7. The touch detection module of claim 6, wherein the frequency modulation parameter set values comprise period values of the reference clocks, the period values being obtained by setting rising or falling periods of the reference clocks, and
wherein the touch driving controller is configured to count the reference clocks that are inputted sequentially, in correspondence with the frequency modulation parameter set values, to generate the touch driving period signal for each of counted periods of the reference clocks, and to generate the touch driving signals based on the touch driving period signal.

8. The touch detection module of claim 1, wherein the touch driving circuit is configured:
to vary a voltage modulation parameter set value in response to a change in a voltage level of the reference clocks, and
to generate and supply a voltage level of the touch driving signals by using the reference clocks and a varied voltage modulation parameter set value.

9. The touch detection module of claim 8, wherein the touch driving circuit comprises:
a reference clock generator configured to generate the reference clocks based on a preset reference voltage;
a reference clock detector configured to generate voltage level information items of the reference clocks in real-time;
a data storage component configured to store and share voltage modulation parameter set values respectively corresponding to the voltage level information items of the reference clocks;
a touch driving controller configured to read, in real-time, from the data storage component, the voltage modulation parameter set values corresponding to the voltage level information items of the reference clocks, and to generate a touch driving period signal according to the reference clocks and the voltage modulation parameter set values; and
a driving signal output component configured to generate the touch driving signals in response to a voltage level of the touch driving period signal, and to supply the touch driving signals to the plurality of driving electrodes.

10. The touch detection module of claim 9, wherein the voltage modulation parameter set values include additional compensatory voltage values for voltages of the reference clocks, and
wherein the touch driving controller is configured to further compensate the voltages of the reference clocks with voltages according to the voltage modulation parameter set values to maintain the voltage level of the touch driving signals.

11. The touch detection module of claim 9, wherein the touch driving controller is configured to further compensate voltages of the reference clocks that are inputted sequentially with voltages according to the voltage modulation parameter set values to generate a touch driving period signal and to maintain the voltage level of the touch driving signals.

12. The touch detection module of claim 9, wherein the touch driving controller is configured:
to compare voltage level information of the reference clocks inputted from the reference clock detector with pre-stored voltage level information or reference voltage information to determine the reference clocks have a voltage error subjected to a variation; and
to be responsive to variations of the voltage level information items of the reference clocks to read, from the data storage component, voltage modulation parameter set values corresponding to additionally inputted voltage level information items of the reference clocks.

13. The touch detection module of claim 12, wherein the voltage modulation parameter set values include additional compensatory voltage values for voltages of the reference clocks, and
wherein the touch driving controller is configured to further compensate voltages of the reference clocks that are inputted sequentially with voltages according to the voltage modulation parameter set values to generate a touch driving period signal and maintain the voltage level of the touch driving signals.

14. A display device, comprising:
a display panel including a display area having a plurality of pixels; and
a touch detection module on a front surface of the display panel and configured to detect a touch input,
wherein the touch detection module comprises:
a plurality of driving electrodes arranged side by side,
a plurality of sensing electrodes staggered with respect to the driving electrodes, and
a touch driving circuit configured to supply touch driving signals to the plurality of driving electrodes and to detect touch detection signals through the plurality of sensing electrodes to detect touch position coordinates, and
wherein the touch driving circuit is configured
to vary frequency modulation parameter set values in response to a change in a frequency of reference clocks, and
to generate and supply a frequency of the touch driving signals by using the reference clocks and a varied frequency modulation parameter set value.

15. The display device of claim 14, wherein the touch driving circuit comprises:
a reference clock generator configured to generate the reference clocks based on a preset reference frequency;
a reference clock detector configured to generate frequency information items of the reference clocks in real-time;
a data storage component configured to store and share frequency modulation parameter set values respectively corresponding to the frequency information items of the reference clocks;
a touch driving controller configured to read in real-time, from the data storage component, the frequency modulation parameter set values corresponding to the frequency information items of the reference clocks, and to generate a touch driving period signal according to the reference clocks and the frequency modulation parameter set values; and a driving signal output component configured to generate the touch driving signals in response to information on a generation period of the touch driving period signal, and to supply the touch driving signals to the plurality of driving electrodes.

16. The display device of claim 15, wherein the touch driving circuit comprises:

a sensing circuit configured to detect the touch detection signals through the plurality of sensing electrodes;

an analog-to-digital converter configured to sequentially convert the touch detection signals into touch data items;

a touch data generator configured to calculate differential data values of the touch data items by comparing the touch data items with preset detection reference data; and a touch coordinate output component configured to calculate the touch position coordinates for the touch data items having large differential data values among the touch data items sequentially detected through the touch data generator.

17. The display device of claim 15, wherein the frequency modulation parameter set values comprise period values of the reference clocks, the period values being obtained by setting rising or falling periods of the reference clocks, and wherein the touch driving controller is configured to generate the touch driving period signal for each generation period of the reference clocks according to the frequency modulation parameter set values to maintain the touch driving period signal and the frequency of the touch driving signals.

18. The display device of claim 15, wherein the touch driving controller is configured to count the reference clocks that are inputted sequentially, in correspondence with the frequency modulation parameter set values, for generating the touch driving period signal for each of period counts of the reference clocks and maintaining the frequency of the touch driving signals.

19. The display device of claim 15, wherein the touch driving controller is configured:

to compare frequency information of the reference clocks inputted from the reference clock detector with pre-stored frequency information or reference frequency information to determine the reference clocks have a frequency error subjected to a variation, and to be responsive to variations of the frequency information items of the reference clocks for reading, from the data storage component, frequency modulation parameter set values corresponding to varied frequency information items of the reference clocks.

20. The display device of claim 19, wherein the frequency modulation parameter set values comprise period values of the reference clocks, the period values being obtained by setting rising or falling periods of the reference clocks, and wherein the touch driving controller is configured to count the reference clocks that are inputted sequentially, in correspondence with the frequency modulation parameter set values, to generate the touch driving period signal for each of period counts of the reference clocks, and to generate the touch driving signals based on the touch driving period signal.

* * * * *